(12) United States Patent
Otomo et al.

(10) Patent No.: US 9,241,295 B2
(45) Date of Patent: Jan. 19, 2016

(54) COMMUNICATION APPARATUS AND COMMUNICATION METHOD

(71) Applicant: FUJITSU LIMITED, Kawasaki-shi, Kanagawa (JP)

(72) Inventors: Toshiya Otomo, Kawasaki (JP); Koichiro Yamashita, Hachioji (JP); Takahisa Suzuki, Kawasaki (JP); Hiromasa Yamauchi, Kawasaki (JP); Koji Kurihara, Kawasaki (JP); Fumihiko Hayakawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 242 days.

(21) Appl. No.: 13/963,548

(22) Filed: Aug. 9, 2013

(65) Prior Publication Data

US 2013/0331108 A1 Dec. 12, 2013

Related U.S. Application Data

(63) Continuation of application No. PCT/JP2011/052952, filed on Feb. 10, 2011.

(51) Int. Cl.
*H04W 40/00* (2009.01)
*H04W 40/22* (2009.01)
*H04W 40/12* (2009.01)
(Continued)

(52) U.S. Cl.
CPC .............. *H04W 40/22* (2013.01); *H04W 28/08* (2013.01); *H04W 40/12* (2013.01); *H04W 28/22* (2013.01)

(58) Field of Classification Search
CPC ...... H04W 40/12; H04W 28/08; H04W 28/22
USPC .................................. 455/445, 7, 63.1, 67.11
See application file for complete search history.

(56) References Cited

U.S. PATENT DOCUMENTS

| | | | |
|---|---|---|---|
| 7,702,280 B2 * | 4/2010 | Takeda et al. | ..................... 455/7 |
| 2004/0242154 A1 | 12/2004 | Takeda et al. | |

FOREIGN PATENT DOCUMENTS

| | | |
|---|---|---|
| JP | 2002-159038 | 5/2002 |
| JP | 2004-27450 | 1/2004 |
| JP | 2005-295087 | 10/2005 |

(Continued)

OTHER PUBLICATIONS

International Search Report mailed Mar. 8, 2011 in corresponding International Application No. PCT/JP2011/052952.

(Continued)

*Primary Examiner* — David Q Nguyen
(74) *Attorney, Agent, or Firm* — Staas & Halsey LLP

(57) ABSTRACT

A communication apparatus includes a first CPU that is capable of executing a communication process at a first processing speed; a measuring unit that measures a first transmission speed when the communication process is executed with a base station; a collecting unit that collects from at least one other apparatus, a second transmission speed between the base station and the apparatus, and a second processing speed of a second CPU included in the other apparatus based on the first transmission speed; a determining unit that determines whether the communication process is to be transferred to the other apparatus, based on the second transmission speed and the second processing speed; and a transferring unit that transfers the communication process to the other apparatus based on a determination result.

17 Claims, 29 Drawing Sheets

(51) Int. Cl.
*H04W 28/08* (2009.01)
*H04W 28/22* (2009.01)

(56) References Cited

FOREIGN PATENT DOCUMENTS

| | | |
|---|---|---|
| JP | 2006-338264 | 12/2006 |
| JP | 2007-89021 | 4/2007 |
| JP | 2010-93387 | 4/2010 |
| JP | 2010-232945 | 10/2010 |
| WO | WO 03/101132 | 12/2003 |

OTHER PUBLICATIONS

International Preliminary Report on Patentability mailed on Aug. 22, 2013 in corresponding International Application No. PCT/JP2011/052952.

* cited by examiner

FIG.4

| COMMUNI-CATION APPARATUS NAME | TRANS-MISSION SPEED B [Mbps] BETWEEN BASE STATION AND COMMUNI-CATION APPA-RATUS | TRANS-MISSION SPEED t [Mbps] BETWEEN COMMUNI-CATION APPA-RATUSES | OPTIMAL TRANSMISSION SPEED T [Mbps] BETWEEN BASE STATION AND COMMUNICATION APPARATUS | MAXIMUM PROCESSING SPEED m [Mbps] IN CPU COMMUNICA-TION PROCESS | CPU IDLE RATE c [%] | PROCES-SING SPEED P [Mbps] OF CPU COMMUNI-CATION PROCESS | RELAY APPA-RATUS V | HOP COUNT H |
|---|---|---|---|---|---|---|---|---|
| COMMUNI-CATION APPARA-TUS 101#0 | 1 | ✕ | 5 | 10 | 50 | 5 | 0 | 1 |
| COMMUNI-CATION APPARA-TUS 101#1 | ✕ | 10 | 5 | ✕ | ✕ | 4 | 1 | 0 |
| COMMUNI-CATION APPARA-TUS 101#2 | ✕ | 10 | 3 | ✕ | ✕ | 5 | 0 | 0 |

$$T_x = \text{Max}(B_x, \text{Min}(T_y, t_{xy}), \text{Min}(T_z, t_{xz}), ...) \quad \cdots(1)$$

$$P_x = m_x * c_x / 100 \quad \cdots(2)$$

| COMMUNI-CATION APPA-RATUS NAME | TRANS-MISSION SPEED B [Mbps] BETWEEN BASE STATION AND COMMUNI-CATION APPA-RATUS | TRANS-MISSION SPEED t [Mbps] BETWEEN COMMUNI-CATION APPA-RATUSES | OPTIMAL TRANSMISSION SPEED T [Mbps] BETWEEN BASE STATION AND COMMUNICATION APPARATUS | MAXIMUM PROCESSING SPEED m [Mbps] IN CPU COMMUNICA-TION PROCESS | CPU IDLE RATE c [%] | PROCES-SING SPEED P [Mbps] OF CPU COMMUNI-CATION PROCESS | RELAY APPA-RATUS V | HOP COUNT H |
|---|---|---|---|---|---|---|---|---|
| COMMUNI-CATION APPARA-TUS 101#0 | ① | ✕ | ⑤ Max(1,⑤,3) | 10 | 50 | 5 | 0 | 1 |
| COMMUNI-CATION APPARA-TUS 101#1 | ✕ | ⑩ | ⑤ Min(10,5) | ✕ | ✕ | 4 | ① | 0 |
| COMMUNI-CATION APPARA-TUS 101#2 | ✕ | ⑩ | ③ Min(10,3) | ✕ | ✕ | 5 | 0 | 0 |

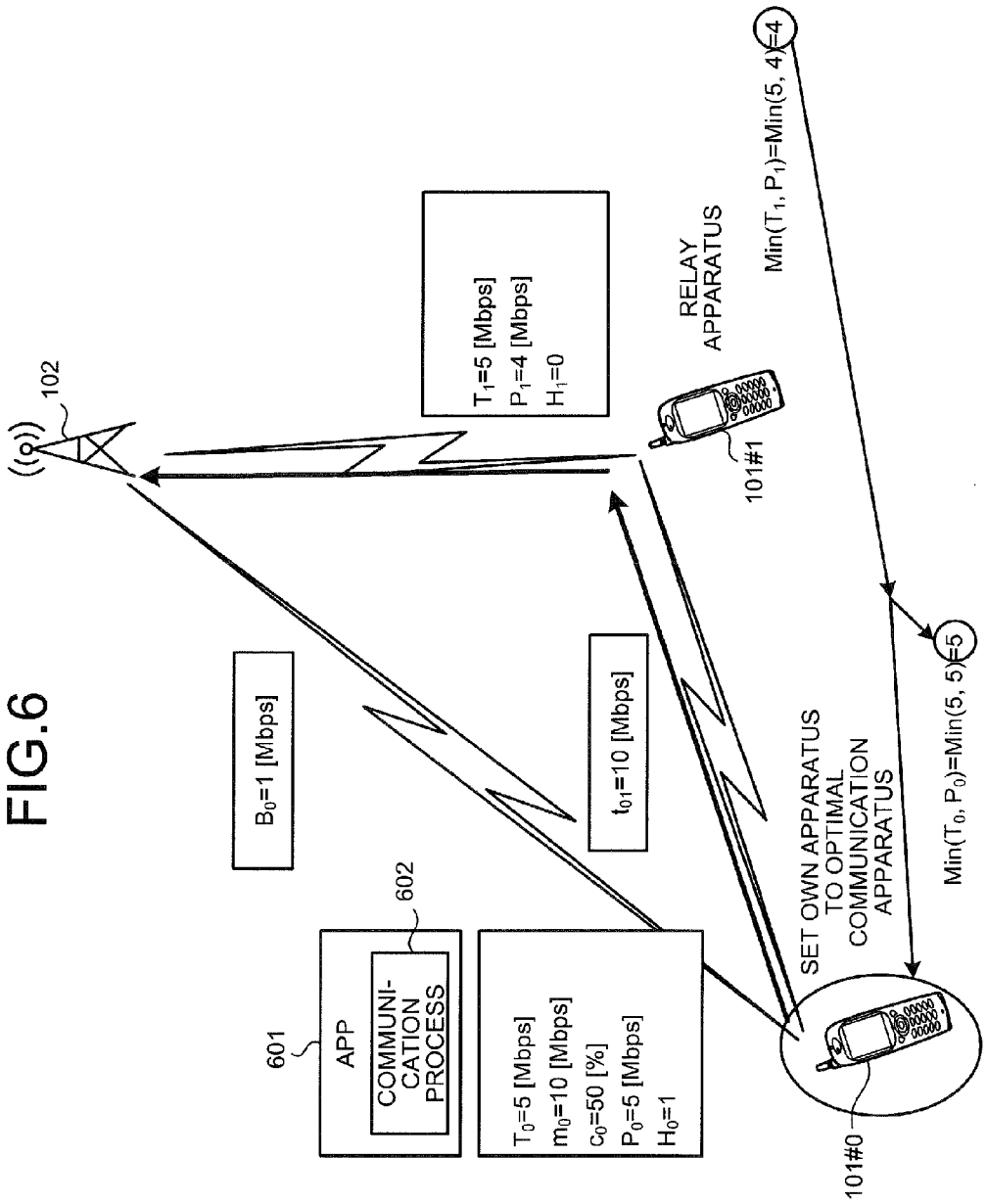

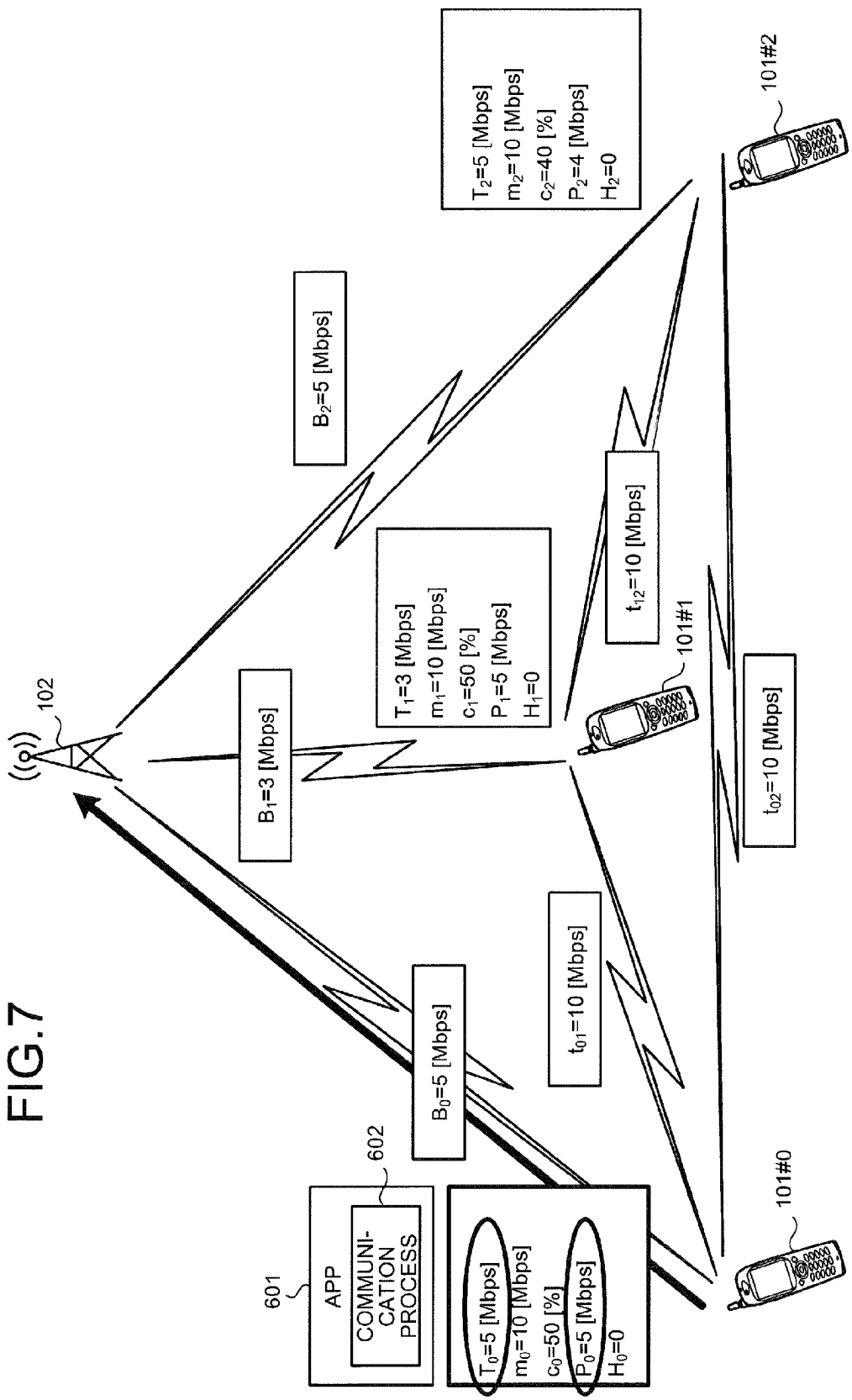

FIG.25

| APPLICATION NAME | CPU PROCESSING SPEED REQUIREMENT | TRANSMISSION SPEED REQUIREMENT |
|---|---|---|
| MAILER APPLICATION | LOW | LOW |
| DOWNLOADER APPLICATION | LOW | HIGH |
| NETWORK GAME APPLICATION | HIGH | LOW |
| STREAMING VIDEO REPRODUCTION APPLICATION | HIGH | HIGH |

FIG.28

| APPLICATION NAME | CPU PROCESSING SPEED REQUIREMENT | TRANSMISSION SPEED REQUIREMENT | APP REQUIRED COMMUNICATION SPEED [Mbps] |
|---|---|---|---|
| MAILER APPLICATION | LOW | LOW | 1 |
| DOWNLOADER APPLICATION | LOW | HIGH | 100 |
| NETWORK GAME APPLICATION | HIGH | LOW | 50 |
| STREAMING VIDEO REPRODUCTION APPLICATION | HIGH | HIGH | 106 |

2801

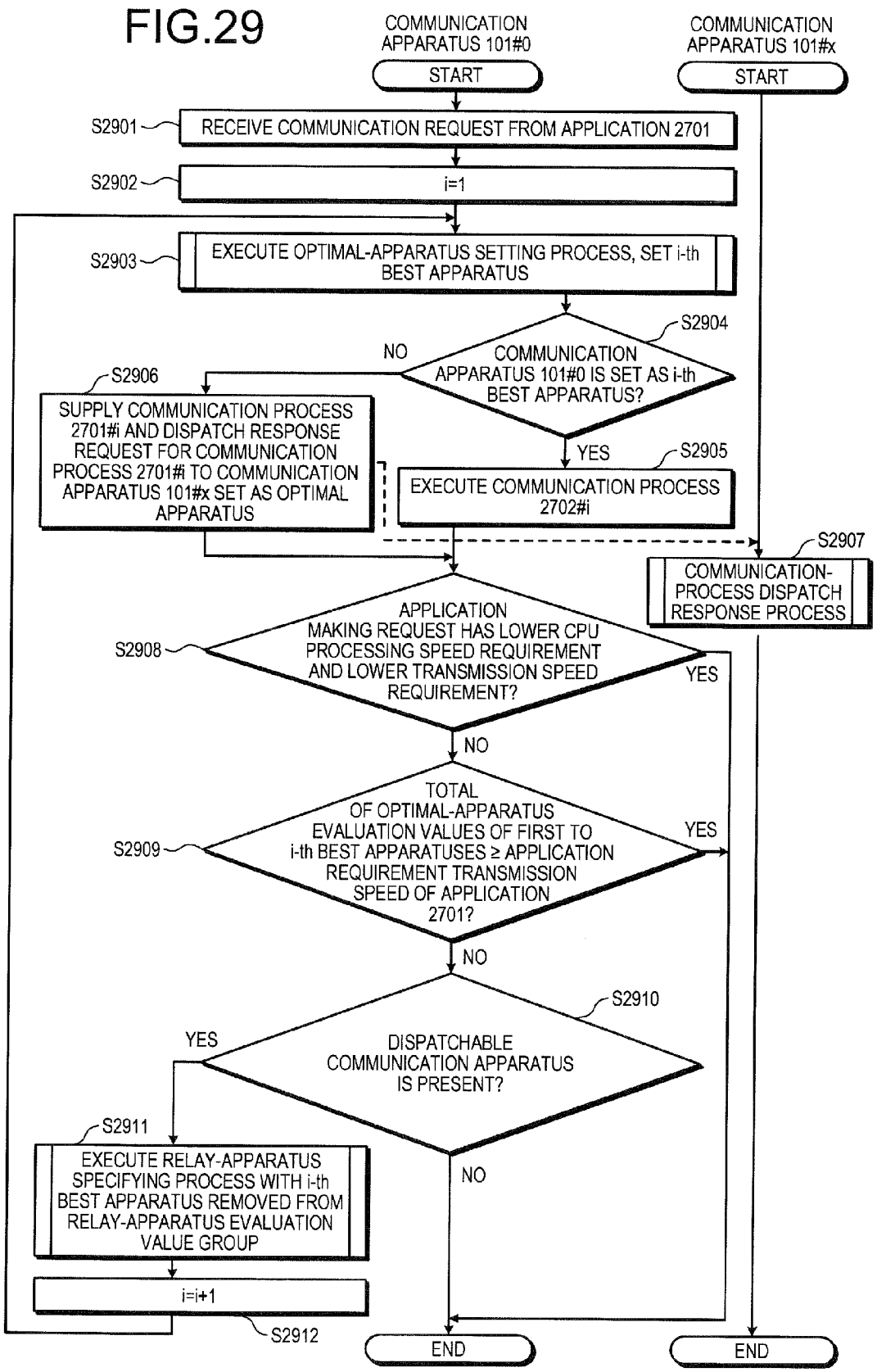

COMMUNICATION APPARATUS AND COMMUNICATION METHOD

CROSS REFERENCE TO RELATED APPLICATIONS

This application is a continuation application of International Application PCT/JP2011/052952, filed on Feb. 10, 2011 and designating the U.S., the entire contents of which are incorporated herein by reference.

FIELD

The embodiments discussed herein are related to a communication apparatus and a communication method.

BACKGROUND

Conventionally, terminal apparatuses such as mobile telephones have performed a radio communication with a base station to receive and transmit information. If the terminal apparatus moves to a location that radio waves from the base station do not reach, communication of the terminal apparatus is cut off and the communication process is interrupted. Disclosed as a technique to address such a case of cutoff of communication between a terminal apparatus and a base station is a technique using ad-hoc communication to allow, for example, another terminal apparatus different from the terminal apparatus to relay communication to the base station (see, for example, Japanese Laid-Open Patent Publication Nos. 2007-89021 and 2004-27450).

Recently, various functions are continually added to terminal apparatuses and consequently, the load placed on the terminal apparatuses is increasing. Disclosed as a load distribution technique is a technique in which a single terminal apparatus has plural radio communication units and performs communication using an optimal radio communication unit. Disclosed as a load distribution technique at a based station is a technique in which a terminal apparatus receives congestion information from plural base stations and selects an optimal base station to perform communication (see, for example, Japanese Laid-Open Patent Publication Nos. 2005-295087 and 2002-159038).

In the prior art described above, however, the techniques of Japanese Laid-Open Patent Publication Nos. 2007-89021 and 2004-27450 have a problem in that a low-speed communication channel may be selected although the communication can continue despite communication between a terminal apparatus and a base station being cut off. The technique of Japanese Laid-Open Patent Publication No. 2005-295087 has a problem in that a specific terminal apparatus may remain subjected to an excessive load.

SUMMARY

According to an aspect of an embodiment, a communication apparatus includes a first CPU that is capable of executing a communication process at a first processing speed; a measuring unit that measures a first transmission speed when the communication process is executed with a base station; a collecting unit that collects from at least one other apparatus, a second transmission speed between the base station and the apparatus, and a second processing speed of a second CPU included in the other apparatus based on the first transmission speed; a determining unit that determines whether the communication process is to be transferred to the other apparatus, based on the second transmission speed and the second processing speed; and a transferring unit that transfers the communication process to the other apparatus based on a determination result.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is an explanatory view of an example of the storage contents of a parameter table 301;

FIG. 5 is an explanatory view of an example of calculation of the parameter table 301;

FIG. 6 is an explanatory view of an example of setting of an optimal apparatus;

FIG. 7 is an explanatory view of the status where the communication apparatus 101#0 is not subjected to a speed reduction;

FIG. 25 is an explanatory view of an example of storage contents of an application attribute table 2401 according to the second embodiment;

FIG. 28 is an explanatory view of an example of storage contents of an application attribute table 2801 according to the third embodiment; and FIG. 29 is a flowchart of the communication-process execution process according to the third embodiment.

DESCRIPTION OF EMBODIMENTS

Embodiments of a communication apparatus and a communication method will be described in detail with reference to the accompanying drawings.

Figure 1:
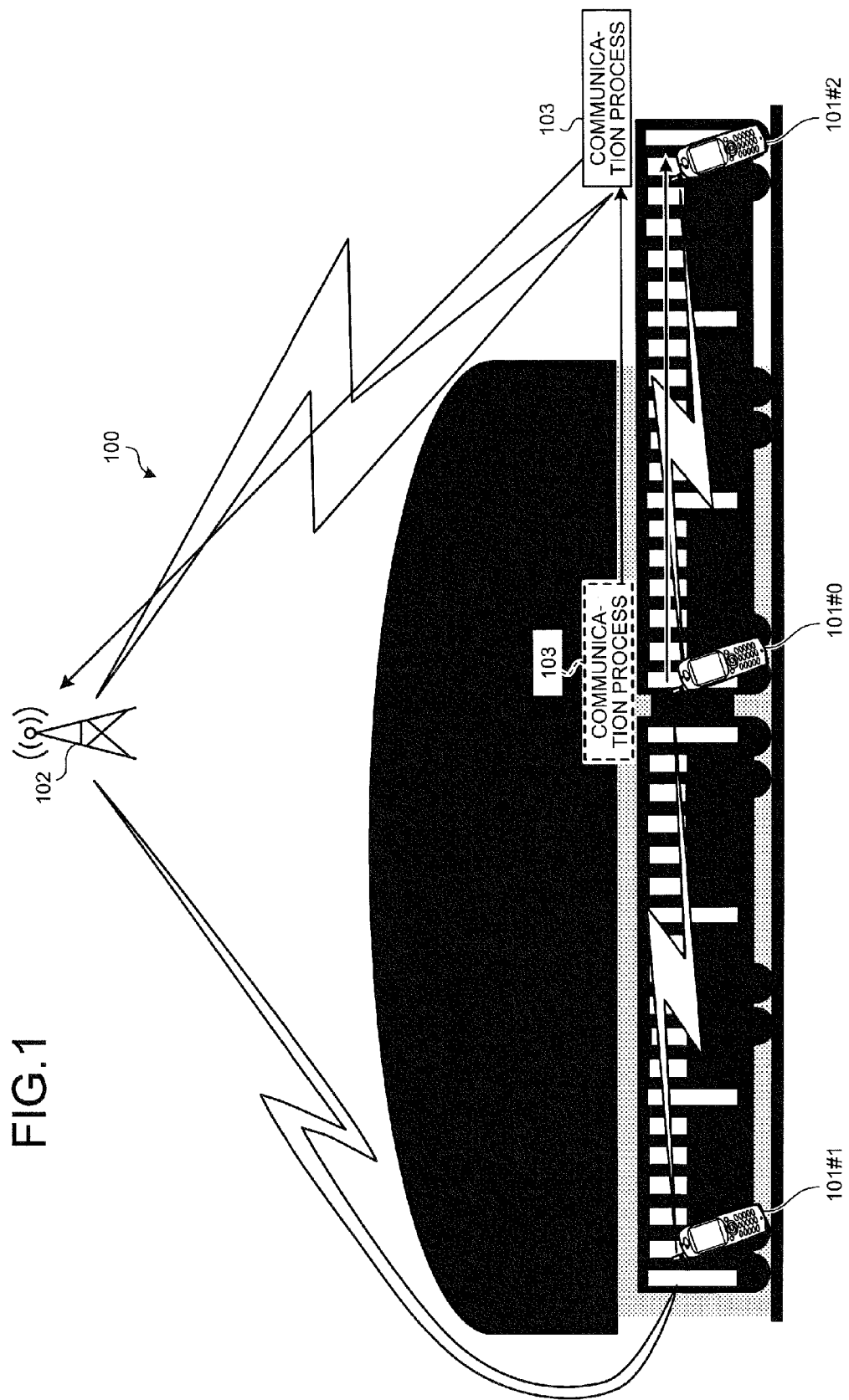
FIG. 1 is an explanatory view of an example of communication channel selection by a communication system 100 according to first to third embodiments.

FIG. 1 is an explanatory view of an example of communication channel selection by a communication system 100 according to first to third embodiments. The communication system 100 includes communication apparatuses 101#0 to 101#2 and a base station 102. The communication apparatuses 101 are small-sized, portable terminals, such as mobile telephones, etc., that can be used by a user.

The base station 102 is an apparatus that performs radio communication with the communication apparatuses 101 and that relays telephone communication and communication with other terminals. Multiple base stations 102 are present, forming a mobile telephone network with the communication apparatuses 101. The base station 102 relays communication between the communication apparatuses 101 and a server through a network. The server is an apparatus that provides a specific service, such as a Web server providing Web page browsing, a mail server providing a mail sending/receiving service, and a video distribution server providing video replay.

FIG. 1 assumes that the communication apparatuses 101#0 to 101#2 are present on the same train and that part of the train is passing through a tunnel in which radio communication with the base station 102 is infeasible. At this time, the communication apparatus 101#0 is located within the tunnel and therefore, cannot communicate with the base station 102. The communication apparatus 101#1 is located near the entrance of the tunnel and therefore can communicate with the base station 102 but with low electric field strength, high noise, and low transmission speed. The communication apparatus 101#2 is located outside the tunnel and therefore, can communicate with the base station 102 with high electric field strength, low noise, and high transmission speed. The communication apparatus 101#0 is can communicate with the communication apparatuses 101#1 and 101#2 through ad-hoc communication, which does not need the intervention of the base station 102.

In this state, a case is assumed where there occurs a connection of the communication apparatus 101#0 to the server by an application executed based on a request from the user, etc. The communication apparatus 101#0 cannot directly communicate with the base station 102 but can communicate with the base station 102 by way of the communication apparatuses 101#1 or 101#2. In this case, the communication apparatus 101#0 selects a communication channel through the communication apparatus 101#2, thereby enabling the communication apparatus 101#0 to perform high-speed communication with the base station 102.

If the communication apparatus 101#2 has a smaller load than the communication apparatus 101#0 and thus, compared to the communication apparatus 101#0, can more rapidly execute a communication process 103 called by an application, the communication apparatus 101#0 transfers the communication process 103 to the communication apparatus 101#2, thereby enabling load to be distributed in the communication system 100.

The communication process 103 may be a process of performing transmission and reception with respect to a server, or a process attendant thereon. An attendant process is, for example, an encoding/decoding process of a Base 64 that is performed upon transmission/reception if the application executed by the communication apparatus 101#0 is a mailer application. If the application is a video replay application, the attendant process is an encoding/decoding process corresponding to a video format. In this manner, the communication system 100 of the present embodiment can select an optimal communication channel from among communication channels and distribute load.

Figure 2:
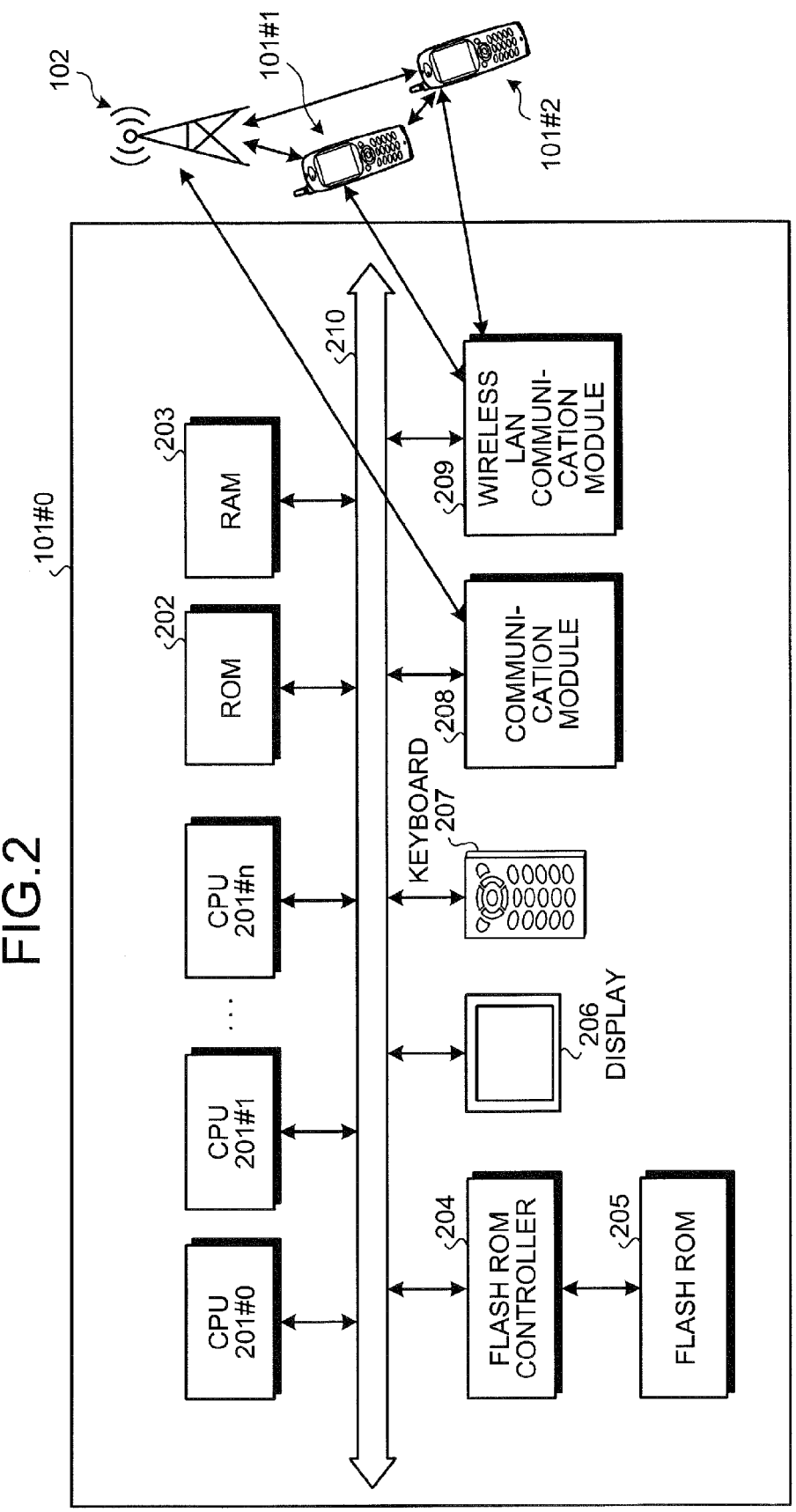
FIG. 2 is a block diagram of the hardware of a communication apparatus 101#0 according to the first to third embodiments.

FIG. 2 is a block diagram of the hardware of the communication apparatus 101#0 according to the first to third embodiments. Although FIG. 2 depicts the hardware of the communication apparatus 101#0, the communication apparatuses 101#1 and 101#2 also include hardware similar to that of the communication apparatus 101#0. In FIG. 2, the communication apparatus 101#0 includes CPUs 201#0 to 201#$n$, read-only memory (ROM) 202, and random access memory (RAM) 203. The communication apparatus 101#0 includes a flash ROM controller 204 and flash ROM 205.

The communication apparatus 101#0 includes, as I/O apparatuses with the user or other apparatuses, a display 206, a keyboard 207, a communication module 208, and a wireless LAN communication module 209, respectively connected through a bus 210.

The CPUs 201#0 to 201#$n$ provide overall control of the communication apparatus 101#0. The CPUs 201#0 to 201#$n$ refer to all CPUs in the form of single-core processors connected in parallel. "n" is an integer greater than or equal to 0. The CPUs 201#0 to 201#$n$ each have dedicated cache memory. A multi-core processor system refers to a computer system that includes a processor equipped with plural cores. As long as plural cores are provided, implementation may be by a single processor equipped with plural cores or a group of single-core processors arranged in parallel. In the first to third embodiments, description will be given taking a configuration of CPUs that are single-core processors and arranged in parallel.

The ROM 202 stores therein programs such as a boot program. The RAM 103 is used as a work area of the CPUs 201#0 to 201#$n$. The flash ROM controller 204, under the control of the CPUs 201#0 to 201#$n$, controls the reading and writing of data with respect to the flash ROM 205. The flash ROM 205 stores data written thereto under the control of the flash ROM controller 204. Examples of the data include image data and video data acquired by the user of the communication apparatus 101 through the communication module 208, and a program for executing the communication method of the present embodiments. A memory card, SD card and the like may be adopted as the flash ROM 205.

The display 206 displays, for example, data such as text, images, functional information, etc., in addition to a cursor, icons, and/or tool boxes. A thin-film-transistor (TFT) liquid crystal display and the like may be employed as the display 206. The keyboard 207 includes, for example, keys for inputting letters, numerals, and various instructions and performs the input of data. Alternatively, a touch-panel-type input pad or numeric keypad, etc. may be adopted.

The communication module 208 is connected to a mobile telephone network via the base stations 102. The communication apparatus 101#0, via the mobile telephone network, is connected to a network such as a local area network (LAN), a wide area network (WAN), and the Internet, and is connected to other apparatuses through the network. The communication apparatus 101#0 may be connected to the communication apparatus 101#1 and the communication apparatus 101#2.

The wireless LAN communication module 209 connects with other communication apparatuses 101 without using the base station 102. For example, the wireless LAN communication module 209 connects with the communication apparatuses 101#1 and 101#2 according to IEEE 802.11. The wireless LAN communication module 209 performs direct communication with the communication apparatuses 101#1 and 101#2 by an ad-hoc mode.

Figure 3:
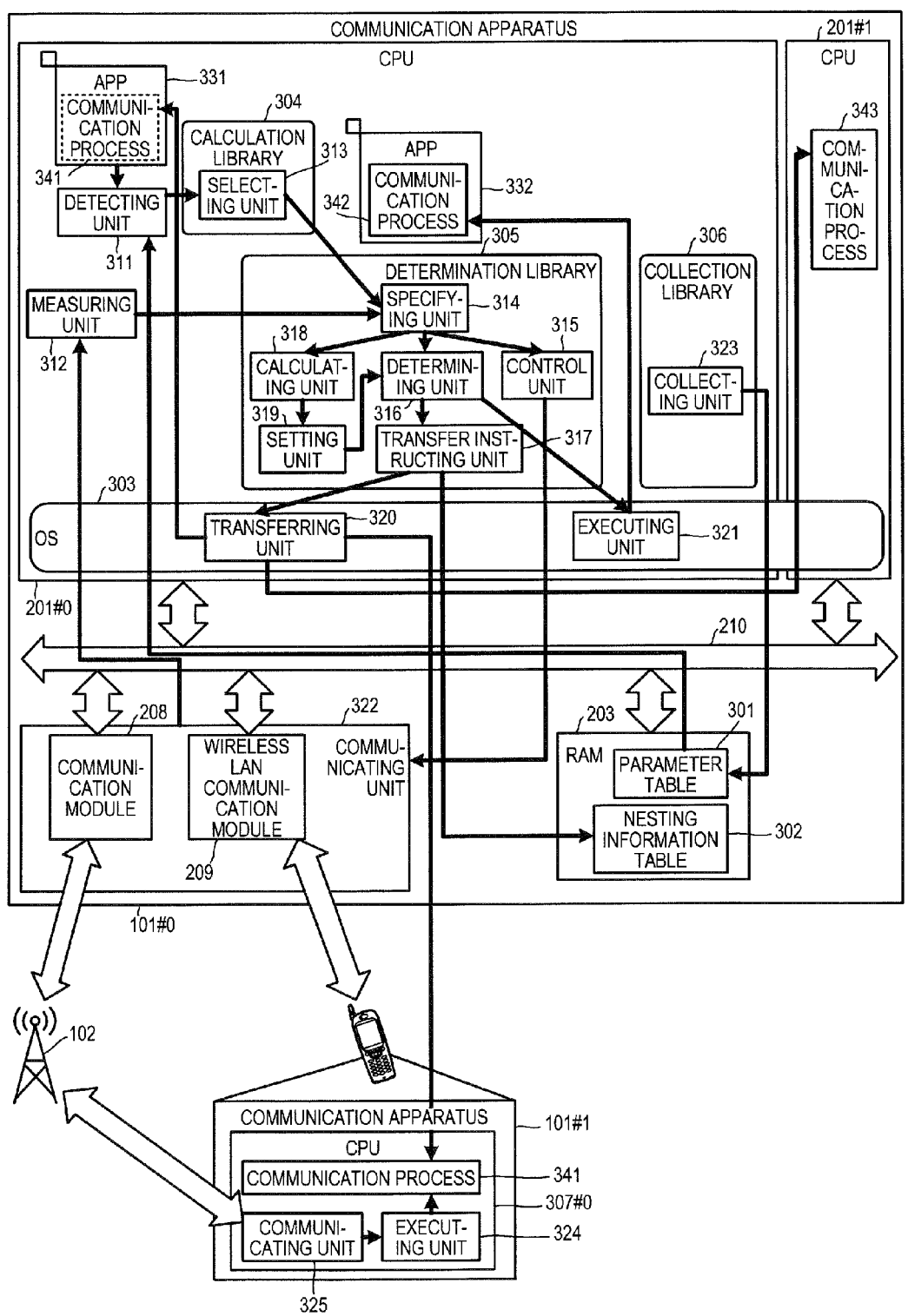
FIG. 3 is a block diagram of functions of the communication system 100 according to the first embodiment.

Functions of the communication system 100 will be described. FIG. 3 is a block diagram of the functions of the communication system 100 according to the first embodiment. The communication system 100 includes a detecting unit 311, a measuring unit 312, a selecting unit 313, a specifying unit 314, a control unit 315, a determining unit 316, a transfer instructing unit 317, a calculating unit 318, and a setting unit 319. The communication system 100 further includes a transferring unit 320, an executing unit 321, a communicating unit 322, a collecting unit 323, an executing unit 324, and a communicating unit 325.

Functions (the detecting unit 311 to the collecting unit 323) as a control unit are implemented by causing the CPU 201#0 to execute a program stored in a storage apparatus. The executing unit 324 and the communicating unit 325 are implemented by causing among CPUs 307#0 to 307#m, the CPU 307#0 to execute a program stored in a storage apparatus. "m" is an integer greater than or equal to 0. The storage apparatus is for example the ROM 202, the RAM 203, or the flash ROM 205 depicted in FIG. 2. Although the detecting unit 311 to the collecting unit 323 are depicted as the functions of the CPU 201#0 in FIG. 3, the detecting unit 311 to the collecting unit 323 may be functions of the CPUs 201#1 to 201#n.

The communication apparatus 101#0 can access a parameter table 301 and a nesting information table 302 in the RAM 203. The communication apparatus 101#0 executes software, i.e., an operating system OS 303, a calculation library 304, a determination library 305, and a collection library 306. The selecting unit 313 is included in the calculation library 304, the specifying unit 314 to the setting unit 319 are included in the determination library 305, and the collecting unit 323 is included in the collection library 306. The communication apparatus 101#0 executes apps 331 and 332 that include communication processes 341 and 342, respectively. Assume that a communication process 343 is a process dispatched from the communication apparatus 101#2.

The parameter table 301 is a table storing therein a transmission speed of its own apparatus to the base station 102 and a transmission speed of another apparatus capable of ad-hoc communication with its own apparatus. The parameter table 301 may store a processing speed at which its own apparatus and another apparatus can execute the communication processes 341 and 242. The details of the parameter table 301 will be described later with reference to FIG. 4.

The nesting information table 302 is a table storing therein nesting information generated when a communication process dispatched to its own apparatus is further dispatched to another apparatus. The details of the nesting information table will be described later with reference to FIG. 14.

The OS 303 is a program for controlling the communication apparatus 101#0. For example, the OS 303 provides libraries used by the apps 331 and 332. The OS 303 manages the memories such as the ROM 202 and RAM 203. The OS 303 performs a scheduling process of the apps 331 and 332 executed by the CPU 201#0.

The calculation library 304 has a function of calculating fields stored in the parameter table 301. Based on the parameter table 301, the determination library 305 determines an optimal communication channel or a communication apparatus 101 capable of executing the communication process 341 or 342 at a high speed. The determination library 305 performs an entry into the nesting information table 302. The determination library 305 refers to the nesting information table 302 to recover the communication process. The collection library 306 inquires the transmission speed and the processing speed from another apparatus capable of ad-hoc communication. The collection library 306 also makes a response corresponding to the inquiry.

The detecting unit 311 has a function of detecting an execution of the communication process in its own apparatus. For example, the detecting unit 311 detects an execution of the communication process 341. The detecting unit 311 may detect a communication process transferred from a transferor apparatus among other apparatuses capable of communicating with its own apparatus without using the base station 102. For example, the detecting unit detects the communication process 343 transferred from the communication apparatus 101#2. The detection information is stored in a storage area of a register, a cache memory, the RAM 203, etc. of the CPU 201#0.

The measuring unit 312 has a function of measuring, when a communication process detected by the detecting unit 311 is executed, a first transmission speed at the time of the execution of the communication process on a first communication channel through which communication is made between its own apparatus and the base station 10. For example, the measuring unit 312 issues Ping to the base station 102 to measure a transmission speed $B_0=1$ [Mbps] with the base station. The value of the first transmission speed is stored in the storage area of the register, the cache memory, the RAM 203, etc. of the CPU 201#0.

The selecting unit 313 has a function of selecting a lower one of a transmission speed between its own apparatus and another apparatus communicable with its own apparatus without using the base station 102 and a transmission speed between the another apparatus and the base station 102, as a second transmission speed of a second communication channel through the another apparatus. It is assumed for example that a transmission speed t between the communication apparatus 101#1 as another apparatus and the communication apparatus 101#0 as its own apparatus is 10 [Mbps] and that a transmission speed T between the communication apparatus 101#1 and the base station 102 is 5 [Mbps]. In this case, the selecting unit 313 selects 5 [Mbps] that is a lower transmission speed. The value of the selected second transmission speed of the second communication channel is stored in the storage area of the register, the cache memory, the RAM 203, etc. of the CPU 201#0.

The specifying unit 314 has a function of specifying, as a specific communication channel, one having a higher transmission speed of the first and the second communication channels. For example, if the first transmission speed of the first communication channel is 1 [Mbps] and if the second transmission speed of the second communication channel is 5 [Mbps], the specifying unit 314 specifies the second communication channel that is a faster communication channel as the specific communication channel. The specifying unit 314 compares the transmission speed between the communication apparatus 101#0 included in the first communication channel and the base station 102 with the transmission speed between the communication apparatus 101#1 included in the second communication channel and the base station 102. If the second communication channel has a higher transmission speed, the specifying unit 314 specifies the communication apparatus 101#1 included in the second communication channel as a relay apparatus.

The specifying unit 314 may specify a specific communication channel based on the number of the communication apparatuses 101 as other apparatuses existing in the communication channel to the base station 102. The number of existence of the communication apparatuses 101 as other apparatuses is referred to as a hop count. It is assumed for example that the communication channel communicating with the base station 102 by way of the communication apparatus 101#1 has a transmission speed of 5 [Mbps] and that the communication channel communicating with the base station 102 by way of the communication apparatuses 101#2 and 101#1 has a transmission speed of 5 [Mbps].

At this time, the specifying unit 314 specifies as a specific communication channel the communication channel having a smaller hop count that communicates with the base station 102 by way of the communication apparatus 101#1. In this case, the specifying unit 314 specifies the communication apparatus 101#1 as the relay apparatus. The specified result information is stored in the storage area of the register, the cache memory, the RAM 203 of the CPU 201#0.

The control unit 315 has a function of controlling other apparatuses, if the second communication channel is specified as a specific communication channel by the specifying unit 314, so that a communication between its own apparatus and the base station 102 is made by way of the other apparatuses. Assume for example a case where the communication channel through the communication apparatus 101#1 is specified as a specific communication channel by the specifying unit 314. At this time, the control apparatus 315 controls the communication apparatus 101#1 so that a communication between its own apparatus and the base station is made by way of the communication apparatus 101#1.

The determining unit 316 has a function of determining whether to transfer a communication process to another apparatus based on the first and the second transmission speeds. For example, if the second transmission speed has a greater value than that of the first transmission speed, the determining unit 316 determines a transfer of the communication process 341 to the communication apparatus 101#1. The determining unit 316 may make a determination based on a first processing speed at which its own apparatus can execute the communication process and the first transmission speed and on a second processing speed at which the another apparatus can execute the communication process and the second transmission speed. The result of the determination is stored in the register, the cache memory, the RAM 203, etc. of the CPU 201#0.

The transfer instructing unit 317 has a function of instructing, when the determining unit 316 determines a transfer of the communication process to another apparatus, the transferring unit 320 to transfer the communication process to the another apparatus. For example, the transfer instructing unit 317 instructs the transferring unit 320 to transfer the communication process 341 to the communication apparatus 101#1.

The instruction execution information may be stored in the register, the cache memory, the RAM 203, etc. of the CPU 201#0.

The transfer instructing unit 317 may instruct the transferring unit 320 to further transfer the communication process transferred from a transferring apparatus to a different other apparatus. For example, the transfer instructing unit 317 instructs the transferring unit 320 to transfer the communication process 343 transferred from the communication apparatus 101#2 to the communication apparatus 101#1. At this time, the transfer instructing unit 317 enters identification information of the communication apparatus 101#2 as a transferring apparatus, identification information of the communication apparatus 101#1 as a transferred apparatus, and identification information of the communication process 343, as nesting information, into the nesting information table 302.

The calculating unit 318 has a function of calculating, when a specific communication channel is specified, for each of the communication apparatuses 101 included in the specific communication channel, an evaluation value based on a transmission speed from the communication apparatus 101 to the base station 102 and on a processing speed at which the communication apparatus 101 can execute the communication process.

Assume for example a case where the specifying unit 314 specifies as a specific communication channel the second communication channel by way of the communication apparatus 101#1. It is also assumed that a transmission speed $T_0$ from the communication apparatus 101#0 to the base station 102 is 1 [Mbps] and that a processing speed $P_0$ at which the communication apparatus 101#0 executes the communication process 341 is 5 [Mbps]. It is further assumed that a transmission speed $T_1$ from the communication apparatus 101#0 through the communication apparatus 101#1 to the base station 102 is 5 [Mbps] and that a processing speed $P_1$ at which the communication apparatus 101#1 executes the communication process 341 is 4 [Mbps].

At this time, the calculating unit 318 calculates evaluation values for the communication apparatuses 101#0 and 101#1 included in the second communication channel. The calculating unit 318 provides $Min(T_0, P_0)=Min(1,5)=1$ [Mbps] as the evaluation value of the communication apparatus 101#0. Similarly, the calculating unit 318 provides $Min(T_1, P_1)=Min(5,4)=4$ [Mbps] as the evaluation value of the communication apparatus 101#1. The calculation results are stored in the register, the cache memory, the RAM 203, etc. of the CPU 201#0.

The setting unit 319 has a function of setting, based on the evaluation values calculated by the calculating unit 318, an execution object apparatus to execute the communication process among communication apparatuses 101 included in a specific communication channel. Assume for example that the calculating unit 318 calculates the evaluation values of the communication apparatuses 101#0 and 101#1 included in the second communication channel as being 1 [Mbps] and 4 [Mbps], respectively. At this time, the setting unit 319 sets the communication apparatus 101#1 having a greater evaluation value as the execution object apparatus. Identification information of the set execution object apparatus may be stored in the register, the cache memory, the RAM 203, etc. of the CPU 201#0.

The transferring unit 320 has a function of transferring a communication process to another apparatus according to an instruction from the transfer instructing unit 317. For example, the transferring unit 320 transfers the communication process 341 to the communication apparatus 101#1. For example, the transferring unit 320 issues an execution code of the communication process 341 stored in the ROM 202, the flash ROM 205, etc. and a value of the register of the CPU 201#0 that is execution information of the communication process 341. The transfer execution information may be stored in the storage area of the register, the cache memory, the RAM 203, etc. of the CPU 201#0.

The transferring unit 320 may recover the execution result of the communication process transferred from another apparatus. For example, the transferring unit 320 may recover the execution result of the communication process 341 transferred to the communication apparatus 101#1. The result of the recovery is stored in the storage area of the register, the cache memory, the RAM 203, etc. of the CPU 201#0 and is read by an application causing the communication process.

The executing units 321 and 324 have a function of executing communication processes. For example, the executing units 321 and 324 execute the communication processes 342 and 341, respectively. The communication process execution information may be stored in the storage area of the register, the cache memory, the RAM 203, etc. of the CPU 201#0.

The communicating units 322 and 325 have a function of transmitting, based on a request from another apparatus performing a communication process at the first transmission speed, the second transmission speed to the base station 102 and the second processing speed, to the another apparatus. For example, based on a request from the communication apparatus 101#1, the communicating unit 322 transmits to the communication apparatus 101#1 the second transmission speed $T_0$ to the base station 102 and the second processing speed $P_0$ of the communication apparatus 101#0. The result of the transmission may be stored in the storage area of the register, the cache memory, the RAM 203, etc. of the CPU 201#0.

The collecting unit 323 has a function of collecting, from at least one other apparatus, based on the first transmission speed, a second transmission speed between the base station 102 and the other apparatus and a second processing speed of the second CPU included in the other apparatus. For example, the collecting unit 323 collects a transmission speed $T_1$ and a processing speed $P_1$ of the communication apparatus 101#1. The result of the collection is stored in the parameter table 301.

FIG. 4 is an explanatory view of an example of the storage contents of the parameter table 301. FIG. 4 depicts an example of the storage contents of a parameter table 301#0 on the communication apparatus 101#0. The parameter table 301 includes fields of name of communication apparatus, transmission speed B between base station and communication apparatus, transmission speed t between communication apparatuses, optimal transmission speed T between base station and communication apparatus. The parameter table 301 further includes fields of maximum processing speed m in CPU communication process, CPU idling rate c, processing speed P of CPU communication process, relay apparatus V, and hop count H. Hereafter, for the simplification of the description, the fields except the name of communication apparatus field are abbreviated to as B, t, T, m, c, P, V, and H.

In the following description, suffixes "0" to "2" imparted to variables other than t indicate that the variables correspond to the communication apparatuses 101#0 to 101#2. For example, $B_0$ indicates a transmission speed between the base station and the communication apparatus, of the communication apparatus 101#0 and is stored in the B field of a record whose communication apparatus name field is "communication apparatus 101#0". Suffixes "01", "02", and "12" are imparted to the transmission speed t between communication apparatuses. These suffixes indicate that the transmission speed is one between corresponding communication apparatuses 101. For example, $t_{01}$ indicates a transmission speed between the communication apparatuses 101#0 and 101#1 and is stored in the t field of a record whose communication apparatus name field is "communication apparatus 101#1".

The communication apparatus name field stores the name of its own apparatus or the name of a communication apparatus capable of ad-hoc connection from its own apparatus. The B field stores a transmission speed from the base station 102 to the communication apparatus 101. For example, if the communication apparatus 101#0 measures the transmission speed from the base station 102 to obtain 1 [Mbps], i.e., $B_0=1$, the communication apparatus 101#0 stores 1 into the B field of the communication apparatus 101#0. The transmission speed between the communication apparatuses 101 is stored into the t field. For example, the communication apparatus 101#0 measures a transmission speed between it and the communication apparatus 101#1 to obtain 10 [Mbps], i.e., $t_{01}=10$, the communication apparatus 101#0 stores 10 into the t field of the communication apparatus 101#1.

The T field stores an optimal communication channel transmission speed among plural communication channels between the base station and the communication apparatus. Assume for example a case where the communication apparatus 101#0 has a communication channel 1 allowing a direct communication with the base station 102 and a communication channel 2 communicating with the base station 102 by way of the communication apparatus 101#1. At this time, the communication apparatus 101#0 sets an optimal communication channel transmission speed based on the transmission speeds of the communication channels 1 and 2 or on the processing speeds, etc. of the respective communication channels. A specific calculation example of the T field will be described later with reference to FIG. 5.

The m field stores a maximum processing speed in the CPU communication process. For example, if the communication apparatus 101#0 can process information of 10 [Mbit] at maximum a second, $m_0=10$ results and 10 is set into the m field of the communication apparatus 101#0. The c field stores a CPU idle rate. For example, if the communication apparatus 101#0 is executing another software, etc. with the CPU idle rate of 50[%], $c_0=50$ results and the communication apparatus 101#0 stores 50 into the c field of the communication apparatus 101#0.

The P field stores a processing speed in the CPU communication process. For example, if the communication apparatus 101#0 can currently process information of 5 [Mbit] a second, $P_0=5$ results and the communication apparatus 101#0 stores 5 into the P field of the communication apparatus 101#0. A specific calculation example of the P field will be described later with reference to FIG. 5.

The V field stores a value indicative of whether its own apparatus communicates with the base station 102 along a communication channel through a corresponding communication apparatus 101 without direct communication with the base station 102. For example, if the communication apparatus 101#0 communicates with the base station 102 along a communication channel through the communication apparatus 101#1, the communication apparatus 101#0 stores 1 indicative of a communication through the communication apparatus 101#1 into the V field of the communication apparatus 101#1. When the parameter table 301#0 has $V_1=1$, the communication apparatus 101#1 may be communicating directly with the base station 102 or may be communicating with the base station 102 by way of another apparatus other than the communication apparatus 101#0. It is described in a parameter table 301#1 whether the communication apparatus 101#1 performs direct communication with the base station 102.

The H field stores the number of the communication apparatuses 101 except its own apparatus lying on the communication channel between its own apparatus and the base station 102. For example, if the communication apparatus 101#0 communicates with the base station 102 by way of the communication apparatus 101#1, $H_0=1$ results and the communication apparatus 101#0 stores 1 into the H filed of the communication apparatus 101#0.

In the parameter table 301#0, m of the records relating to the communication apparatus 101#0 is acquired by the communication apparatus 101#0 depending on the specifications or set values of its own apparatus. As for B and c, the communication apparatus 101#0 sets the results of the measurement. As for T, P, V, and H, the communication apparatus 101#0 sets the results acquired by a calculation method depicted in FIG. 5.

About T, P, and H of the records relating to other apparatuses of the communication apparatus 101#0, the communication apparatus 101#0 inquires of other apparatuses communicable with its own apparatus without the intervention of the base station, to acquire them through an inquiry response process. As for t, the communication apparatus 101#0 sets the result of measurement. As for V, 0 is set as its initial value and the communication apparatus 101#0 sets it using the result of calculation of T of the communication apparatus 101#0.

FIG. 5 is an explanatory view of an example of calculation of the parameter table 301. Numerical expressions designated at reference numeral 501 are ones for calculating T and P. The explanatory view designated at reference numeral 502 shows the state where the numerical expressions 501 are applied to the parameter table 301 of FIG. 4. An optimal transmission speed $T_x$ of a communication apparatus 101#x is calculated by Equation (1) below.

$$T_x=\text{Max}(B_x, \text{Min}(T_y, t_{xy}), \text{Min}(T_z, t_{xz}), \ldots) \quad (1)$$

Suffixes y and z represent communication apparatuses 101#y and 101#z that can communicate with the communication apparatus 101#x without using the base station 102. The processing speed P of the communication apparatus 101#x is calculated from Equation (2) below.

$$P_x=m_x*c_x/100 \quad (2)$$

In the relay apparatus V field, using arguments of a Max function from Equation (1) as evaluation values, 1 is set to a apparatus corresponding to a maximum evaluation value. Hereafter, the arguments of the Max function are referred to as relay-apparatus evaluation values. For example, if its own apparatus is a communication apparatus 101#x, the relay-apparatus evaluation value of the communication apparatus 101#x results in B. Similarly, the relay-apparatus evaluation value of the communication apparatus 101#y results in Min $(T_y, t_{xy})$ and the relay-apparatus evaluation value of the communication apparatus 101#z results in Min$(T_z, t_{xz})$. When its own apparatus communicates directly with the base station 102, no relay apparatus exists. Accordingly, when Bx of its own apparatus is a maximum value in the arguments of the Max function from Equation (1), the communication apparatus 101#x need not alter the V field.

In the explanatory view designated at reference numeral 502 are depicted examples of calculation of T and P of the communication apparatus 101#0 and examples of setting of V of the communication apparatuses 101#0 to 101#2, set in FIG. 4. The communication apparatus 101#0 calculates $T_0$ and $P_0$ from Equations (1) and (2) as follows.

$T_0=\text{Max}(B_0, \text{Min}(T_2, t_{01}), \text{Min}(T_2, t_{02}))$
⇔ $T_0=\text{Max}(1, \text{Min}(10, 5), \text{Min}(10, 3))$
⇔ $T_0=\text{Max}(1, 5, 3)$
⇔ $T_0=5[\text{Mbps}]$
$P_0=m_0*c_0/100$
⇔ $P_0=10*50/100=5$ [Mbps]

Similarly, the communication apparatus 101#0 sets $V_1$ and $V_2$. Since the relay-apparatus evaluation value=1 of the communication apparatus 101#0, the relay-apparatus evaluation value=5 of the communication apparatus 101#1, and the relay-apparatus evaluation value=3 of the communication apparatus 101#2, the communication apparatus 101#0 specifies the communication apparatus 101#1 as the relay apparatus. For example, the communication apparatus 101#0 stores 1 into the V field for the communication apparatus 101#1.

FIG. 6 is an explanatory view of an example of setting of an optimal apparatus. FIG. 6 depicts a setting example of the optimal apparatus when the communication system 100 is in the state of the parameter table 301 of FIG. 4. The optimal apparatus refers to an execution subject apparatus that executes a communication process 602 included in an application software (hereafter, app) 601. A method of setting an optimal apparatus includes setting as the optimal apparatus a apparatus having maximum values of Min(T, P) that are evaluation values for determining the optimal apparatus, among its own apparatus and relay apparatuses. Hereafter, the evaluation value for determining an optimal apparatus is referred to as an optimal apparatus evaluation value. In the example of FIG. 6, the communication apparatus 101#0 calculates the optimal apparatus evaluation value of the communication apparatus 101#0 as its own apparatus as follows.

$\text{Min}(T_0, P_0)=\text{Min}(5,5)=5$

The communication apparatus 101#0 calculates the optimal apparatus evaluation value of the communication apparatus 101#1 specified as the relay apparatus as follows.

$\text{Min}(T_1, P_1)=\text{Min}(5,4)=4$

From the above, the optimal apparatus results in the communication apparatus 101#0. Accordingly, the communication apparatus 101#0 in the state of the parameter table 301#0 performs a communication process of an app by its own apparatus and performs through the communication apparatus 101#1 a communication with the base station 102 arising from the communication process.

Referring to FIGS. 7 to 11, the state of the communication system 100 selecting an optimal communication channel will be described using the parameter table 301 depicted in FIGS. 4 and 5. FIGS. 7 to 11 assume the status where the communication apparatus 101#0 executes the app 601 including the communication process 602. The communication apparatus 101 depicted in FIGS. 7 to 11, when a transmission speed B between it and the base station is greater than 1 [Mbps], performs a communication between the communication apparatus 101 and the base station 102 without retrieving a communication channel passing through another apparatus.

FIG. 7 is an explanatory view of the status where the communication apparatus 101#0 is not subjected to a speed reduction. In the status of FIG. 7, the transmission speeds B between the base station 102 and the communication apparatuses 101#0 to 101#2 are respectively $B_0=5$ [Mbps], $B_1=3$ [Mbps], and $B_2=5$ [Mbps]. The transmission speeds t between the communication apparatuses 101 are respectively $t_{01}=t_{02}=t_{12}=10$ [Mbps].

Set as values relating to its own apparatus of the parameter table 301#0 are $t_0=5$ [Mbps], $m_0=10$ [Mbps], $c_0=50[\%]$, $P_0=5$ [Mbps], and $B_0=5$ [Mbps]. As for the H field, $H_0=0$ results due to the direct communication between the communication apparatus 101#0 and the base station 102. $t_{01}$ and $t_{02}$ need not be stored in the parameter table 301#0 due to the securement of a sufficient transmission speed between its own apparatus and the base station 102 in the status of FIG. 7.

Similarly, set in the parameter table 301#1 are $T_1=3$ [Mbps], $m_1=10$ [Mbps], $c_1=50[\%]$, $P_1=5$ [Mbps], $B_1=3$ [Mbps], and $H_1=0$. Set in the parameter table 301#2 are $T_2=5$ [Mbps], $m_2=10$ [Mbps], $c_2=40[\%]$, $P_2=4$ [Mbps], $B_2=5$ [Mbps], and $H_2=0$.

Since $B_0=5$ [Mbps], i.e., the transmission speed between its own apparatus and the base station 102 is sufficient in the status of FIG. 7, the communication apparatus 101#0 is an optimal apparatus so that the communication apparatus 101#0 performs the communication process 602. When the transmission speed between its own apparatus and the base station 102 is sufficient, the communication apparatus 101#0 does not inquire T, P, and H of other apparatuses.

Figure 8:
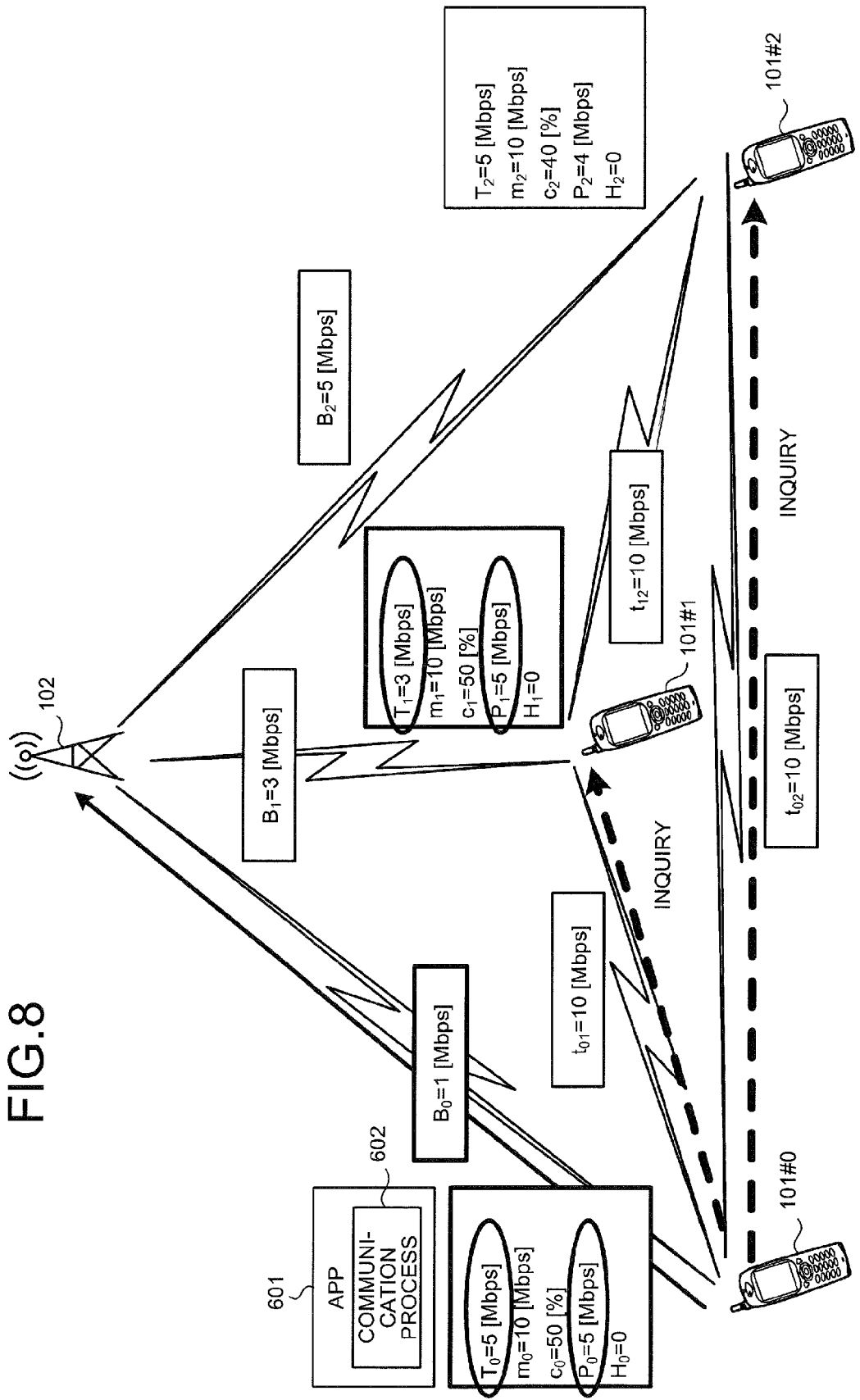
FIG. 8 is an explanatory view of inquiry operations at the time of a reduction in the transmission speed of the communication apparatus 101#0.

FIG. 8 is an explanatory view of inquiry operations at the time of a reduction in the transmission speed of the communication apparatus 101#0. The communication system 100 depicted in FIG. 8 shows the status where $B_0$ lowers from the status of FIGS. 7 to 1 [Mbps]. Due to the reduction of the transmission speed, the communication apparatus 101#0 inquires T, P, and H of the surrounding communication apparatuses 101.

For example, the communication apparatus 101#0 inquires of the communication apparatuses 101#1 and 101#2. As a result of the inquiry, the communication apparatus 101#1 notifies the communication apparatus 101#0 of $T_2$, $P_2$, and $H_1$. Similarly, the communication apparatus 101#2 notifies the communication apparatus 101#0 of $T_2$, $P_2$, and $H_2$.

Based on $T_1$, $P_1$, $T_2$, and $P_2$, the notified communication apparatus 101#0 calculates $T_0$, $P_0$, and $V_0$ to $V_2$ to store them in the parameter table 301#0. The communication apparatus 101#0 acquires $T_0$ as a specific calculation result from Equation (1).

$T_0=\text{Max}(B_0, \text{Min}(T_1, t_{01}), \text{Min}(T_2, t_{02}))$
$\Leftrightarrow T_0=\text{Max}(1, \text{Min}(3,10), \text{Min}(5, 10))$
$\Leftrightarrow T_0=\text{Max}(1, 3, 5)=5$ [Mbps]

Similarly, the communication apparatus 101#0 acquires $P_0$ from Equation (2).

$P_0=m_0*c_0/100$
$\Leftrightarrow P_0=10*50/100=5$ [Mbps]

The communication apparatus 101#0 specifies as a relay apparatus the communication apparatus 101#2 having a maximum evaluation value among the relay-apparatus evaluation values $(B_0, \text{Min}(T_1, t_{01}), \text{Min}(T_2,t_{02}))=(1,3,5)$. As a result, the communication apparatus 101#0 stores $V_2=1$ and $V_0=V_2=0$ for V of the parameter table 301.

Figure 9:
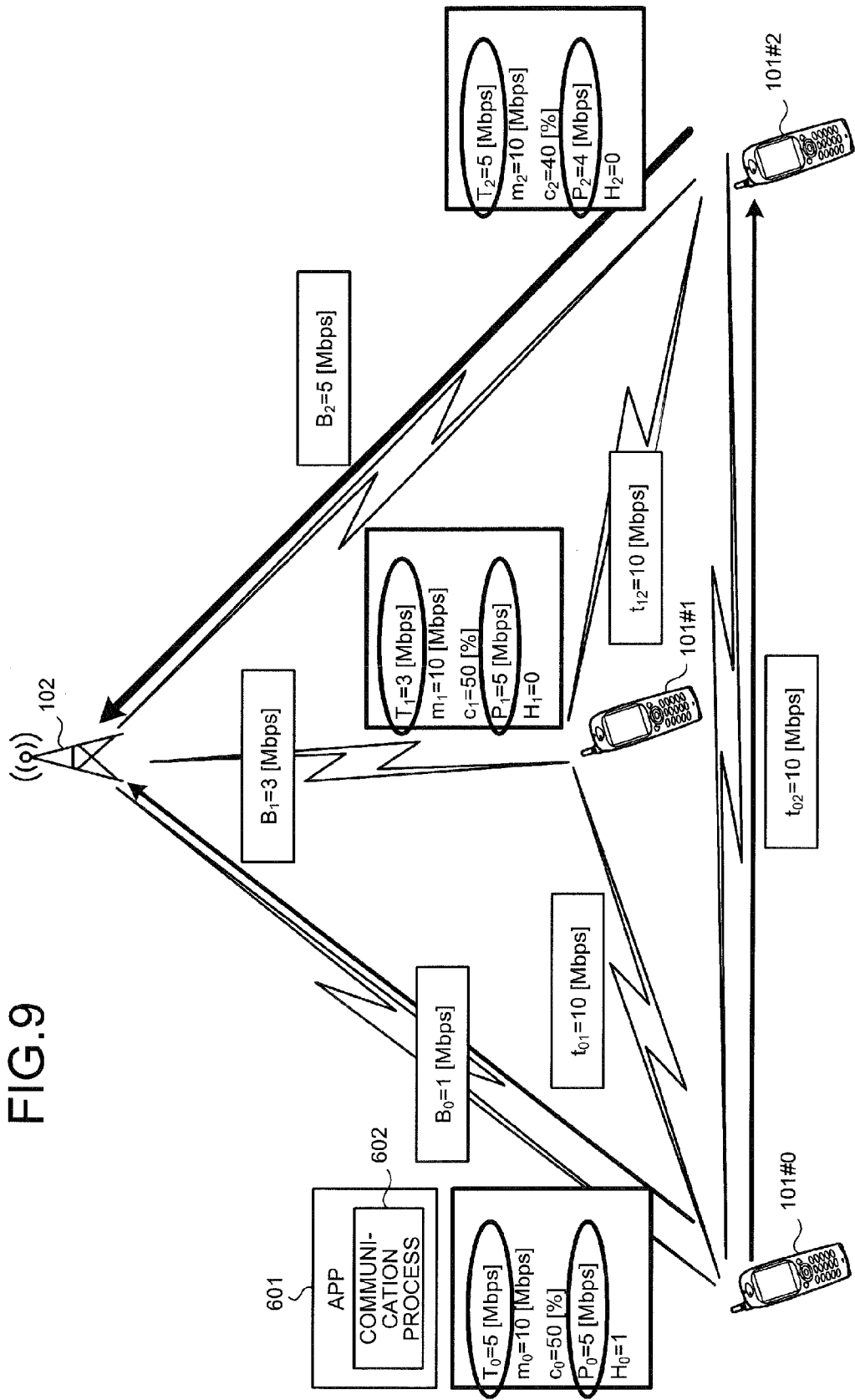
FIG. 9 is an explanatory view of a channel selection method at the time of a reduction in the transmission speed of the communication apparatus 101#0.

FIG. 9 is an explanatory view of a channel selection method at the time of a reduction in the transmission speed of the communication apparatus 101#0. The communication system 100 depicted in FIG. 9 shows the status where, with the reduced $B_0$, the communication apparatus 101#0 calculates $T_0$, $P_0$, and $V_0$ to $V_2$ based on $T_1$, $P_1$, $T_2$, and $P_2$.

After the calculation, the communication apparatus 101#0 sets an optimal apparatus. The optimal apparatus evaluation values of FIG. 9 are $(\text{Min}(T_0,P_0),\text{Min}(T_2,P_2))=(\text{Min}(5,5), \text{Min}(5,4))=(5,4)$. Since, from the above, the communication apparatus having a maximum optimal apparatus evaluation value is the communication apparatus 101#0 among the communication apparatus 101#0 and the relay apparatuses, the communication apparatus 101#0 sets the communication apparatus 101#0 as the optimal apparatus.

As a result of this, the communication system 100 allows the communication apparatus 101#0 to perform the communication process 602. Since, from $V_2=1$, the communication apparatus 101#2 is specified as the relay apparatus from the communication apparatus 101#0, a selected communication channel is a communication channel extending from the communication apparatus 101#0 through the communication apparatus 101#2 to the base station 102. This enables the communication system 100 to perform the communication process 602 using a faster communication channel than the communication channel for direct communication between the communication apparatus 101#0 and the base station 102.

Figure 10:
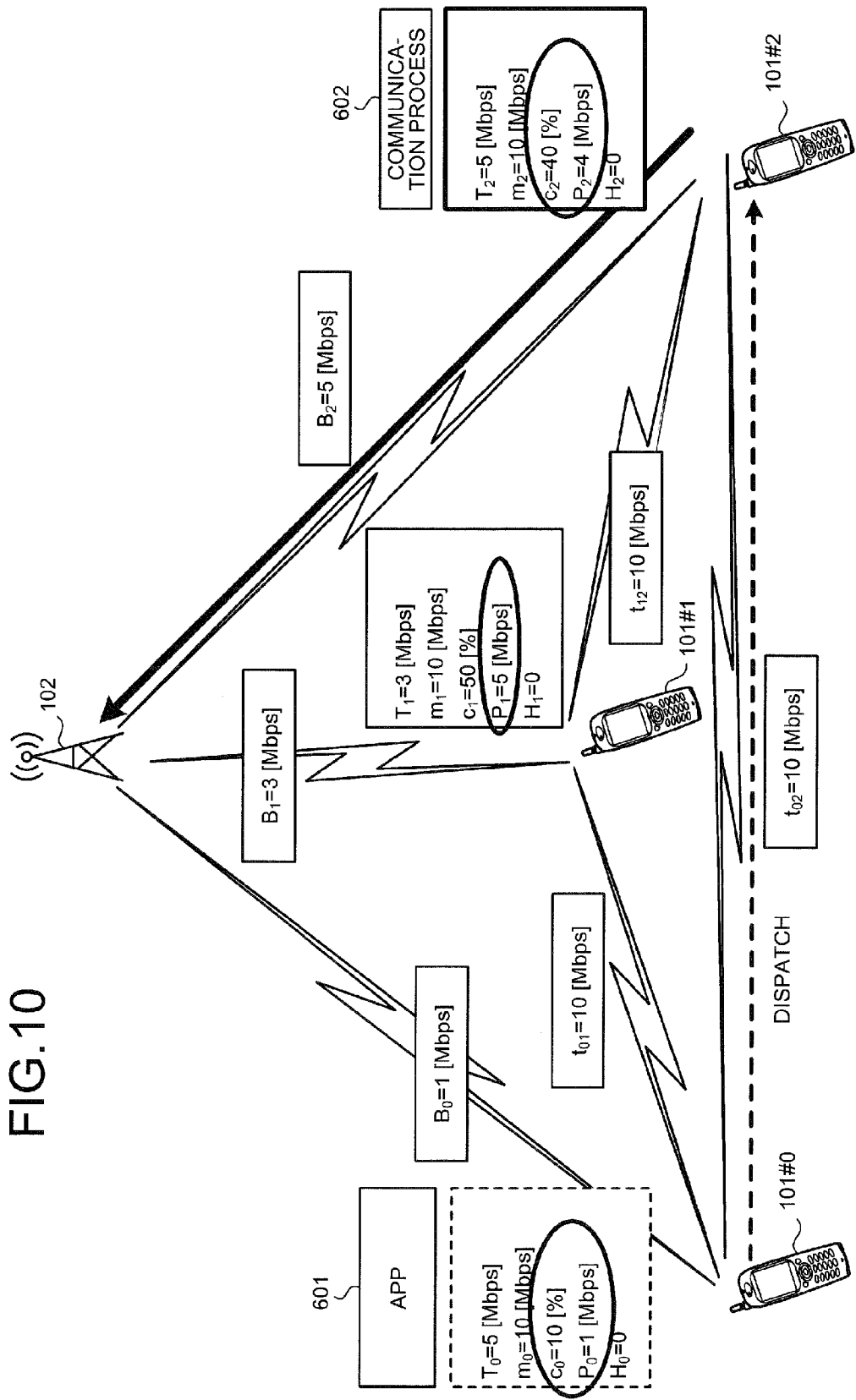
FIG. 10 is an explanatory view of an inquiry action at the time of a reduction in the processing speed of the communication apparatus 101#0.

FIG. 10 is an explanatory view of an inquiry action at the time of a reduction in the processing speed of the communication apparatus 101#0. The communication system 100 depicted in FIG. 10 shows the case where the CPU idle rate c lowers to 10[%] from 50[%] in the status of the communication system 100 depicted in FIG. 9. At this time, the communication apparatus 101#0 again sets an optimal apparatus. Since the transmission speed is unvaried from the status of FIG. 9, $T_0=5$ [Mbps] results leaving the communication apparatus 101#2 specified as the relay apparatus.

First, as a result of a variation of $c_0$, the communication apparatus 101 acquires new $P_0$ from Equation (2).

$P_0=m_0*c_0/100$
$\Leftrightarrow P_0=10*10/100=1$ [Mbps]

Accordingly, the optimal apparatus evaluation values of FIG. 10 result in $(\text{Min}(T_0,P_0),\text{Min}(T_2,P_2))=(\text{Min}(5,1),\text{Min}(5, 4))$. From the above, the communication apparatus 101#2 has a maximum optimal apparatus evaluation value among its own apparatus and the relay apparatuses, so that the communication apparatus 101#2 is set as the optimal apparatus. Since the optimal apparatus performs the communication process 602, the communication apparatus 101#0 dispatches the communication process 602 to the communication apparatus 101#2.

Consequently, in the communication system 100, the communication apparatus 101#0 having a less CPU throughput does not execute the communication process 602 but the communication apparatus 101#2 having a more CPU throughput executes the communication process 602, thereby achieving the load distribution. When the CPU throughput is running short, the process in execution may slow down. The communication system 100 depicted in FIG. 10 dispatches the communication process 602 to the communication apparatus 101 having a more throughput, thereby preventing the processing speed of the communication process 602 from lowering.

Figure 11:
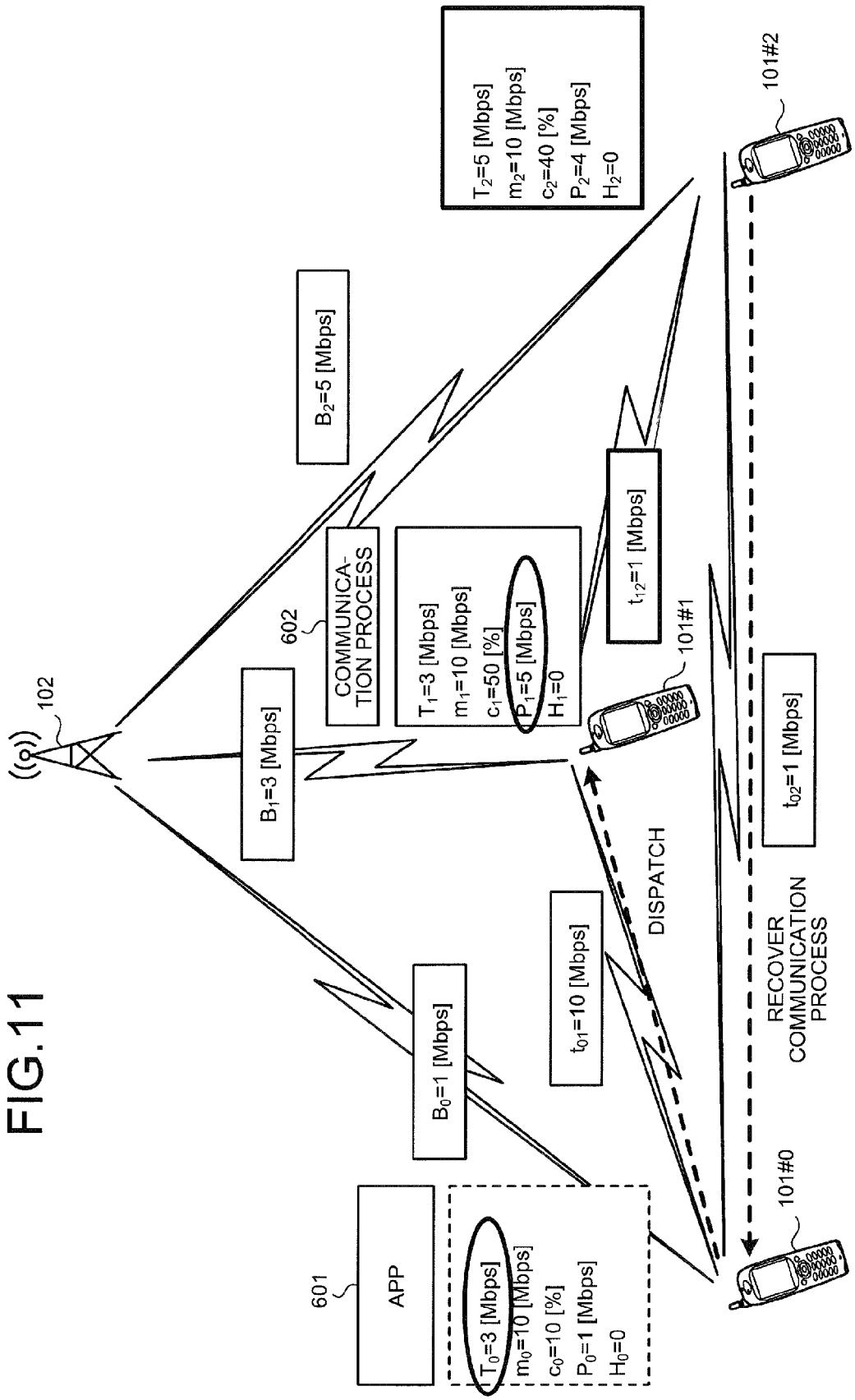
FIG. 11 is an explanatory view of a channel selection method at the time of a reduction in the transmission speed between the communication apparatuses 101.

FIG. 11 is an explanatory view of a channel selection method at the time of a reduction in the transmission speed between the communication apparatuses 101. The communication system 100 depicted in FIG. 11 shows the status where $t_{02}$ and $t_{12}$ lowers from 10 [Mbps] to 1 [Mbps] as a result of movement of the communication apparatus 101#2 away from the communication apparatuses 101#0 and 101#1 in the status of the communication system 100 of FIG. 10.

Due to the variation of $t_{02}$ and $t_{12}$, the communication apparatus 101#0 recalculates $T_0$ from Equation (1).

$T_0=\text{Max}(B_0, \text{Min}(T_1, t_{01}), \text{Min}(T_2, t_{02}))$
$\Leftrightarrow T_0=\text{Max}(1, \text{Min}(3, 10), \text{Min}(5, 1))$
$\Leftrightarrow T_0=\text{Max}(1, 3, 1)=3$ [Mbps]

Since $c_0$ is unvaried, the value of $P_0$ remains 1 [Mbps]. Subsequently, the communication apparatus 101#0 specifies as the relay apparatus the communication apparatus 101#1 corresponding to the maximum value 3 among $(B_0, \text{Min}(T_1, t_{01}),\text{Min}(T_2,t_{02}))=(1,3,1)$. As a result, the communication apparatus 101#0 stores $V_1=1$ and $V_0=V_2=0$ in V of the parameter table 301.

The communication apparatus 101#0 then calculates the optimal apparatus evaluation values for its own apparatus and the relay apparatuses to set an optimal apparatus. The optimal apparatus evaluation values of FIG. 11 are Min($T_0$,$P_0$),Min ($T_1$,$P_1$))=(Min(3,1),Min(3,5)).

From the above, the communication apparatus having a maximum optimal apparatus evaluation value is the communication apparatus 101#1 among its own apparatus and the relay apparatuses and therefore the communication apparatus 101#1 is set as the optimal apparatus. As a result of the change of the optimal apparatus, the communication process 602 dispatched to the communication apparatus 101#2 is recovered and the communication process 602 is dispatched to the communication apparatus 101#1. In this manner, when the communication channel is changed, the communication system 100 again retrieves a fastest communication channel and executes the communication process by an optimal apparatus lying in the fastest communication channel, with the result that the communication process can efficiently be executed.

Figure 12:
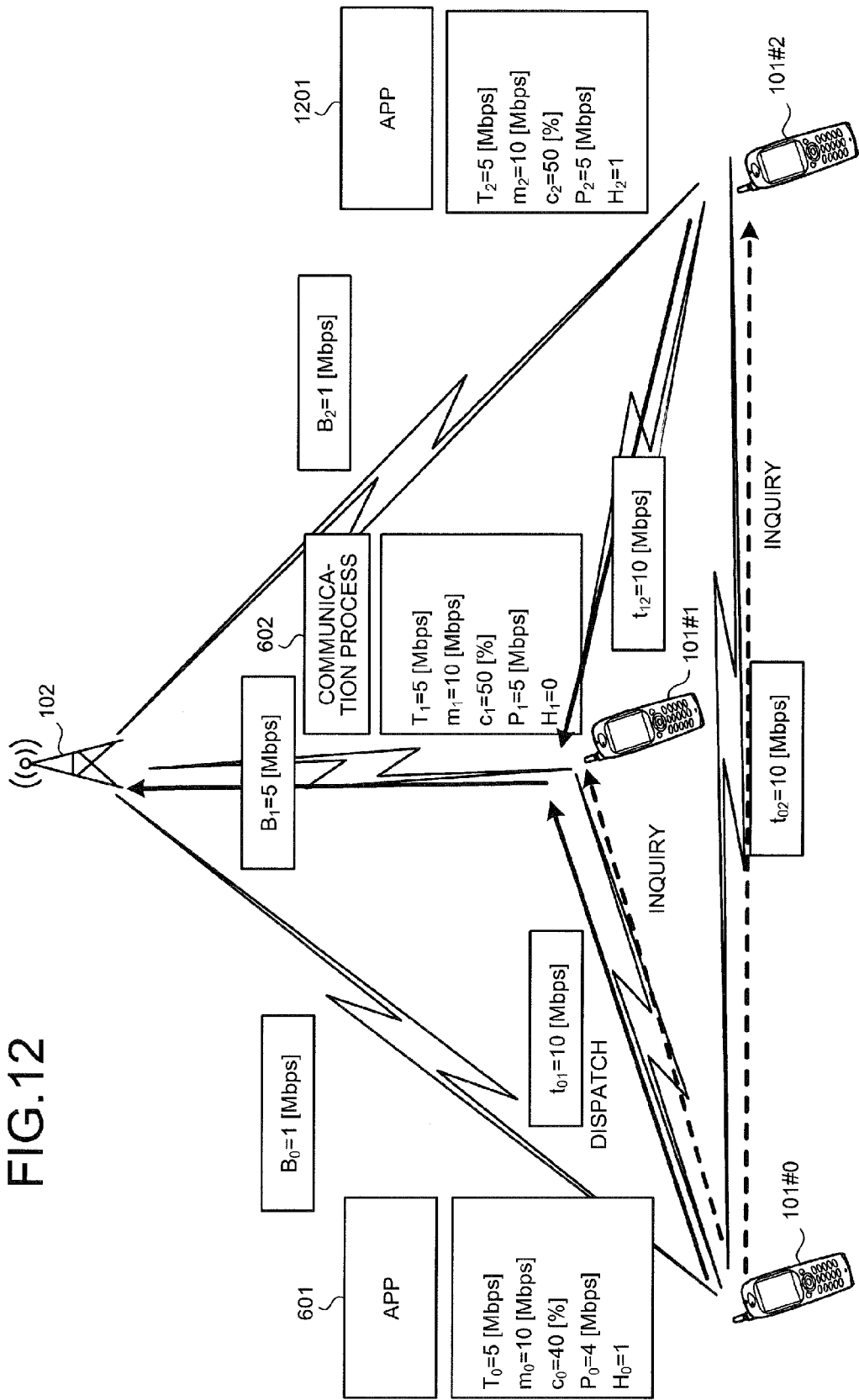
FIG. 12 is an explanatory view of a channel selecting method when multiple communication apparatuses have the same relay-apparatus evaluation value.

FIG. 12 is an explanatory view of a channel selecting method when multiple communication apparatuses have the same relay-apparatus evaluation value. In the communication system 100 depicted in FIG. 12, the communication apparatus 101#2 already executes an app 1201 via the communication apparatus 101#1. It is assumed that the transmission speed B of the communication apparatus 101#0 is reduced in this state.

The transmission speeds B between the base station 102 and the communication apparatuses 101#0 to 101#2 are $B_0$=1 [Mbps], $B_1$=5 [Mbps], $B_2$=1 [Mbps], respectively. The transmission speeds t between the communication apparatuses 101 are $t_{01}$=$t_{02}$=$t_{12}$=10 [Mbps]. The parameter table 301#0 has values related to the communication apparatuses 101#0 set to $m_0$=10 [Mbps], $c_0$=40 [%], and $B_0$=1 [Mbps]. For $P_0$, 4 [Mbps] is set from Equation (2).

Since the transmission speed B is reduced, the communication apparatus 101#0 makes inquiries to the communication apparatus 101#1 and the communication apparatus 101#2, executes the inquiry response process, and calculates a relay-apparatus evaluation value. As a result of the inquiries, the communication apparatus 101#0 receives the values of $T_1$=5 [Mbps], $P_1$=5 [Mbps], and $H_1$=0 from the communication apparatus 101#1 and $T_2$=5 [Mbps], $P_2$=5 [Mbps], and $H_2$=1 from the communication apparatus 101#2. As a result, the communication apparatus 101#0 calculates $T_0$ from Equation (1) as follows.

$T_0$=Max(1, Min(5, 10), Min(5, 10))=5

The relay-apparatus evaluation value of the communication apparatus 101#0 is $B_0$=1. Similarly, the relay-apparatus evaluation value of the communication apparatus 101#1 is Min($T_1$, $t_{01}$)=Min(5, 10)=5 and the relay-apparatus evaluation value of the communication apparatus 101#2 is Min($T_2$, $t_{02}$)=Min(5, 10)=5.

Since the communication apparatus 101#1 and the communication apparatus 101#2 have the same relay-apparatus evaluation values, the communication apparatus 101#0 specifies an apparatus having a smaller hop number H as the relay apparatus. In the case of FIG. 12, because of $H_2$=0 and $H_2$=1, the communication apparatus 101#0 sets the communication apparatus 101#1 as the relay apparatus. Since the communication apparatus 101#1 is specified as the relay apparatus, the communication apparatus 101#0 sets $H_0$ to $H_1$+1=1.

After specifying the relay apparatus, the communication apparatus 101#0 sets an optimal apparatus. An optimal-apparatus evaluation value group of FIG. 12 is (Min($T_0$, $P_0$), Min($T_1$, $P_1$))=(Min(5, 4), Min(5, 5))=(4, 5). Therefore, since the largest best-apparatus evaluation value between the communication apparatus 101#0 and the relay apparatus is that of the communication apparatus 101#1, the communication apparatus 101#0 sets the communication apparatus 101#1 as an optimal apparatus. As described above, the communication system 100 can select the shortest channel of the communication channel by reference to the hop number.

Figure 13:
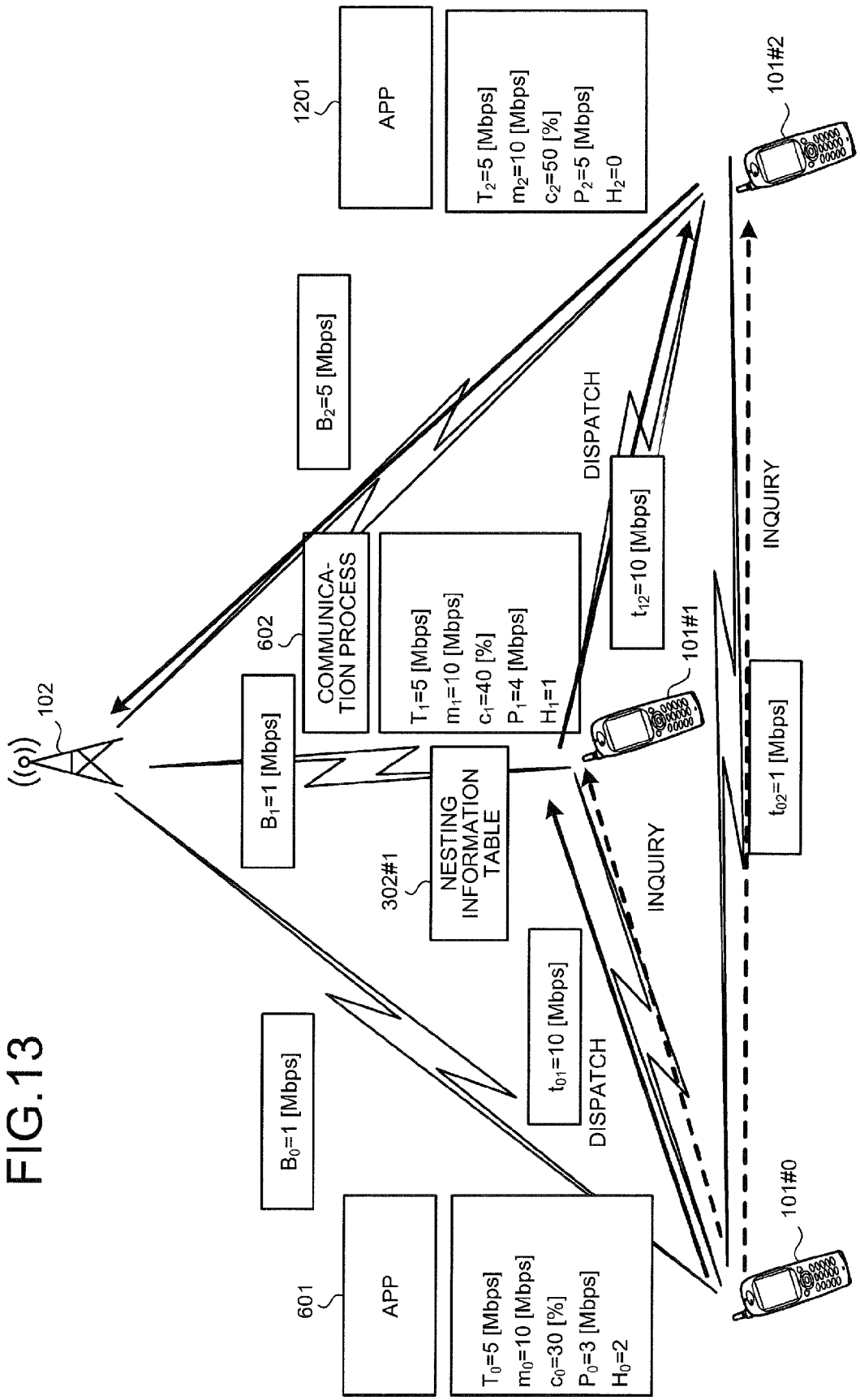
FIG. 13 is an explanatory view of a state of the communication system 100 when a nesting information table 302 is generated.

FIG. 13 is an explanatory view of a state of the communication system 100 when a nesting information table 302 is generated. In the communication system 100 depicted in FIG. 13, the communication apparatus 101#1 already performs communication via the communication apparatus 101#2. It is assumed that the transmission speed B of the communication apparatus 101#0 is reduced in this state. For specific transmission speeds, the transmission speeds B between the base station 102 and the communication apparatuses 101#0 to 101#2 are $B_0$=$B_1$=1 [Mbps] and $B_2$=5 [Mbps]. The transmission speeds t between the communication apparatuses 101 are $t_{01}$=$t_{12}$=10 [Mbps] and $t_{02}$=1 [Mbps].

The parameter table 301#0 has values related to the communication apparatuses 101#0 set to $T_0$=5 [Mbps], $m_0$=10 [Mbps], $C_0$=30[%]. $P_0$=3 [Mbps], and $B_0$=1 [Mbps]. The communication apparatus 101#0 makes inquiries to the communication apparatus 101#1 and the communication apparatus 101#2 and calculates $T_0$=5 [Mbps].

The communication apparatus 101#0 specifies the communication apparatus 101#1 having the largest evaluation value in the relay-apparatus evaluation value group ($B_0$, Min ($T_1$, $t_{01}$), Min($T_2$, $t_{02}$))=(1, 5, 1) as the relay apparatus. Since the communication apparatus 101#1 is specified as the relay apparatus, the communication apparatus 101#0 sets $H_0$ to $H_1$+1=2.

Similarly, an optimal-apparatus evaluation value group of FIG. 13 is (Min($T_0$, $P_0$), Min($T_1$, $P_1$))=(Min(5, 3), Min(5, 4))=(3, 4). Therefore, since the largest best-apparatus evaluation value between the communication apparatus 101#0 and the relay apparatus is that of the communication apparatus 101#1, the communication apparatus 101#0 sets the communication apparatus 101#1 as an optimal apparatus. As a result, the communication apparatus 101#0 dispatches the communication process 602 to the communication apparatus 101#1.

The communication apparatus 101#1 receiving the dispatched communication process 602 sets an optimal apparatus. An optimal-apparatus evaluation value group in the communication apparatus 101#1 of FIG. 13 is (Min($T_2$, $P_1$), Min ($T_2$, $P_2$))=(Min(5, 4), Min(5, 5))=(4, 5). Therefore, since the largest best-apparatus evaluation value is that of the communication apparatus 101#2, the communication apparatus 101#1 sets the communication apparatus 101#2 as an optimal apparatus. As a result, the communication apparatus 101#1 dispatches the communication process 602 to the communication apparatus 101#2.

As a result, since the communication apparatus 101#1 further dispatches the dispatched communication process 602 to another apparatus, the communication apparatus 101#1 stores nesting information into the nesting information table 302#1. A specific example of the nesting information table 302#1 will be described later with reference to FIG. 14.

Figure 14:
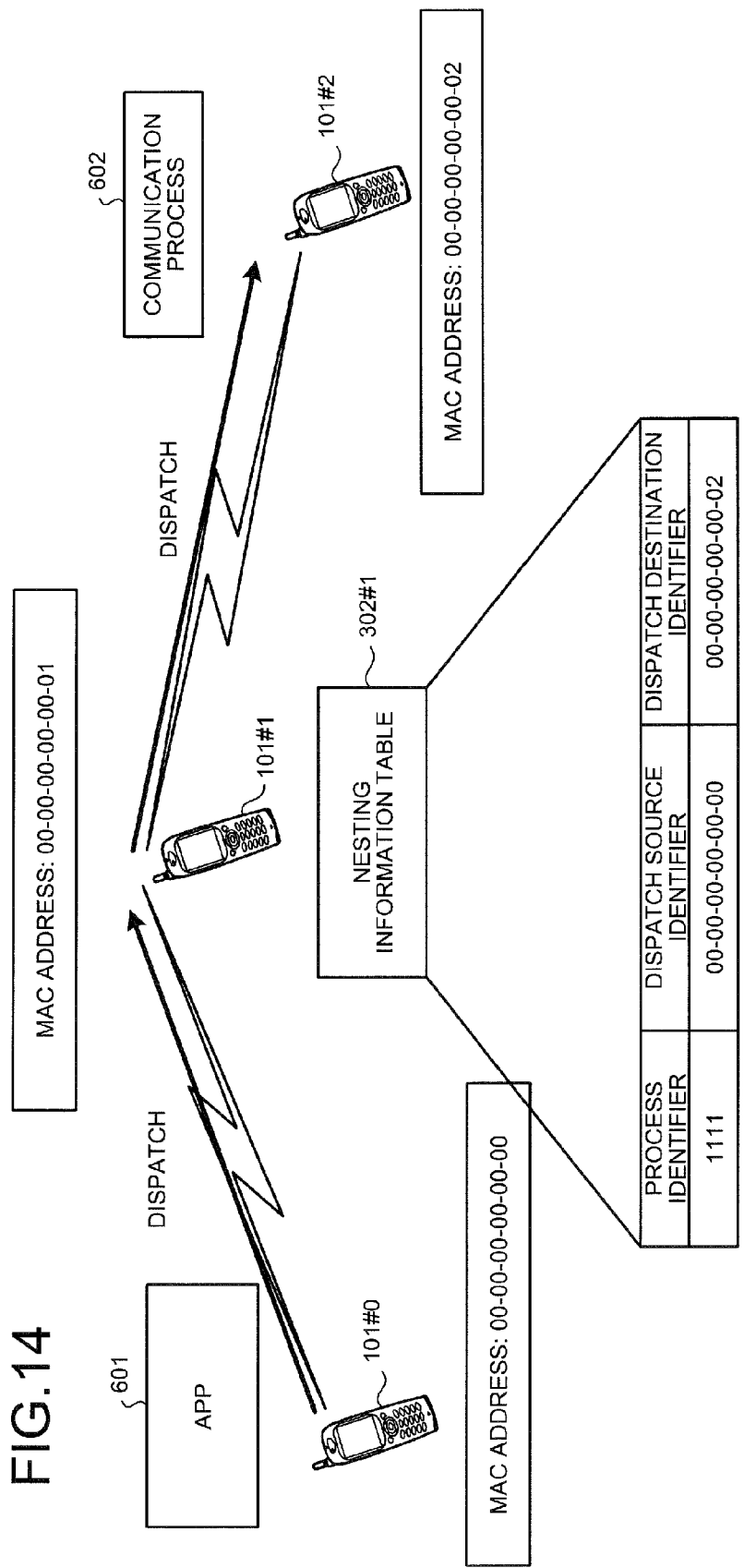
FIG. 14 is an explanatory view of an example of storage contents of the nesting information table 302.

FIG. 14 is an explanatory view of an example of storage contents of the nesting information table 302. FIG. 14 depicts a configuration of the parameter table 301 generated in the communication system 100 of FIG. 13 and an example of storage contents.

The nesting information table 302 includes three fields of a process identifier, a dispatch source identifier, and a dispatch destination identifier. The process identifier field stores identification information enabling unique identification of the dispatched communication process 602. The identification information enabling the unique identification of the communication process 602 may be a function name or a leading address of the function of the communication process 602, a number assigned to the communication process 602, etc. The dispatch source identifier field stores identification information enabling the unique identification of the communication apparatus 101 that is the dispatch source.

The dispatch destination identifier field stores identification information enabling the unique identification of the communication apparatus 101 that is the dispatch destination. The identification information enabling the unique identification of the communication apparatus 101 may be a Media Access Control (MAC) address, Subscriber Identity Module (SIM) Identification (ID), etc.

For example, it is assumed that the communication system 100 depicted in FIG. 14 has the identification information of the app 601 as "1111". A MAC address is employed as the identifier of the communication apparatus 101 and the MAC address of the communication apparatus 101#0 is "00-00-00-00-00-00". Similarly, it is assumed that the MAC address of the communication apparatus 101#1 is "00-00-00-00-00-01" and that the MAC address of the communication apparatus 101#2 is "00-00-00-00-00-02".

In this case, a record of the nesting information table 302#1 has "1111" stored in the process identifier field. The record of the nesting information table 302#1 has "00-00-00-00-00-00" stored in the dispatch source identifier field and "00-00-00-00-00-02" stored in the dispatch destination identifier field.

Figure 15:
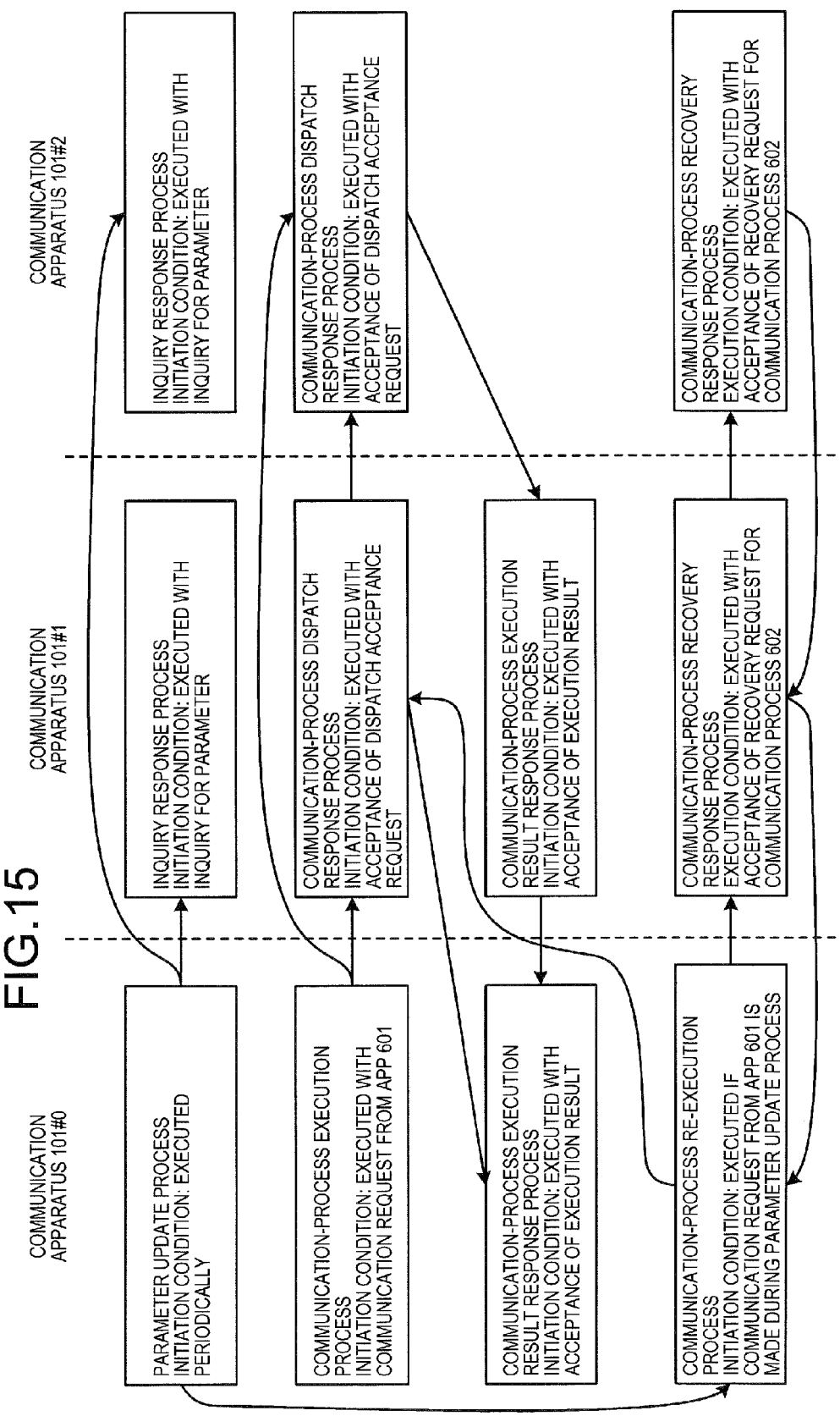
FIG. 15 is an explanatory view of process transition of the communication system 100.

FIG. 15 is an explanatory view of process transition of the communication system 100. FIG. 15 depicts a transition diagram of a process group depicted in FIGS. 16 to 23. The communication system 100 depicted in FIGS. 15 to 23 is assumed to be in a state in which the communication apparatus 101#0 executes the app 601 including the communication process 602 as is the case with the setting depicted in FIG. 6.

The communication apparatus 101#0 periodically executes a parameter update process. In the parameter update process, the communication apparatus 101#0 makes inquiries for parameters to the communication apparatus 101#1 and the communication apparatus 101#2. The communication apparatus 101#1 and the communication apparatus 101#2 execute an inquiry response process corresponding to the inquiries for parameters.

The communication apparatus 101#0 executes a communication-process execution process according to a communication request from the app 601. In the communication-process execution process, the communication apparatus 101#0 makes a dispatch acceptance request for the communication process to the apparatus defined as an optimal apparatus of the communication apparatus 101#1 and the communication apparatus 101#2. For example, if the communication apparatus 101#1 is defined as an optimal apparatus for the communication apparatus 101#0, the communication apparatus 101#1 accepts the request and executes a dispatch response process. If the dispatch response process is completed by the communication apparatus 101#1, the communication apparatus 101#1 supplies an execution result to the communication apparatus 101#0 that is the dispatch source. In response to the acceptance of the execution result, the communication apparatus 101#0 executes a communication-process execution result response process.

In the dispatch response process, if the communication apparatus 101#2 is defined as an optimal apparatus for the communication apparatus 101#1, the communication apparatus 101#1 makes a dispatch acceptance request for the communication process to the communication apparatus 101#2. The communication apparatus 101#2 accepts the request and executes a dispatch response process. If the dispatch response process is completed by the communication apparatus 101#2, the communication apparatus 101#2 supplies an execution result to the communication apparatus 101#1 that is the dispatch source. In response to the acceptance of the execution result, the communication apparatus 101#1 supplies the execution result to the communication apparatus 101#0 that is the dispatch source.

If a communication request from the app 601 is made during the parameter update process, the communication apparatus 101#0 executes a communication-process re-execution process. The communication apparatus 101#0 makes a dispatch acceptance request for the communication process 602 to the apparatus defined as an optimal apparatus of the communication apparatus 101#1 and the communication apparatus 101#2. If an optimal apparatus is changed from the previous time, an optimal apparatus before the change is supplied with a recovery request for the communication process 602. For example, an optimal apparatus before the change is the communication apparatus 101#1, the communication apparatus 101#1 accepts the recovery request for the communication process 602 and executes a communication-process recovery response process.

In the communication-process recovery response process, if the communication apparatus 101#2 is an optimal apparatus for the communication apparatus 101#1, the communication apparatus 101#1 supplies the recovery request for the communication process 602 to the communication apparatus 101#2. The communication apparatus 101#2 accepts the recovery request and executes the communication-process recovery response process.

Figure 16:
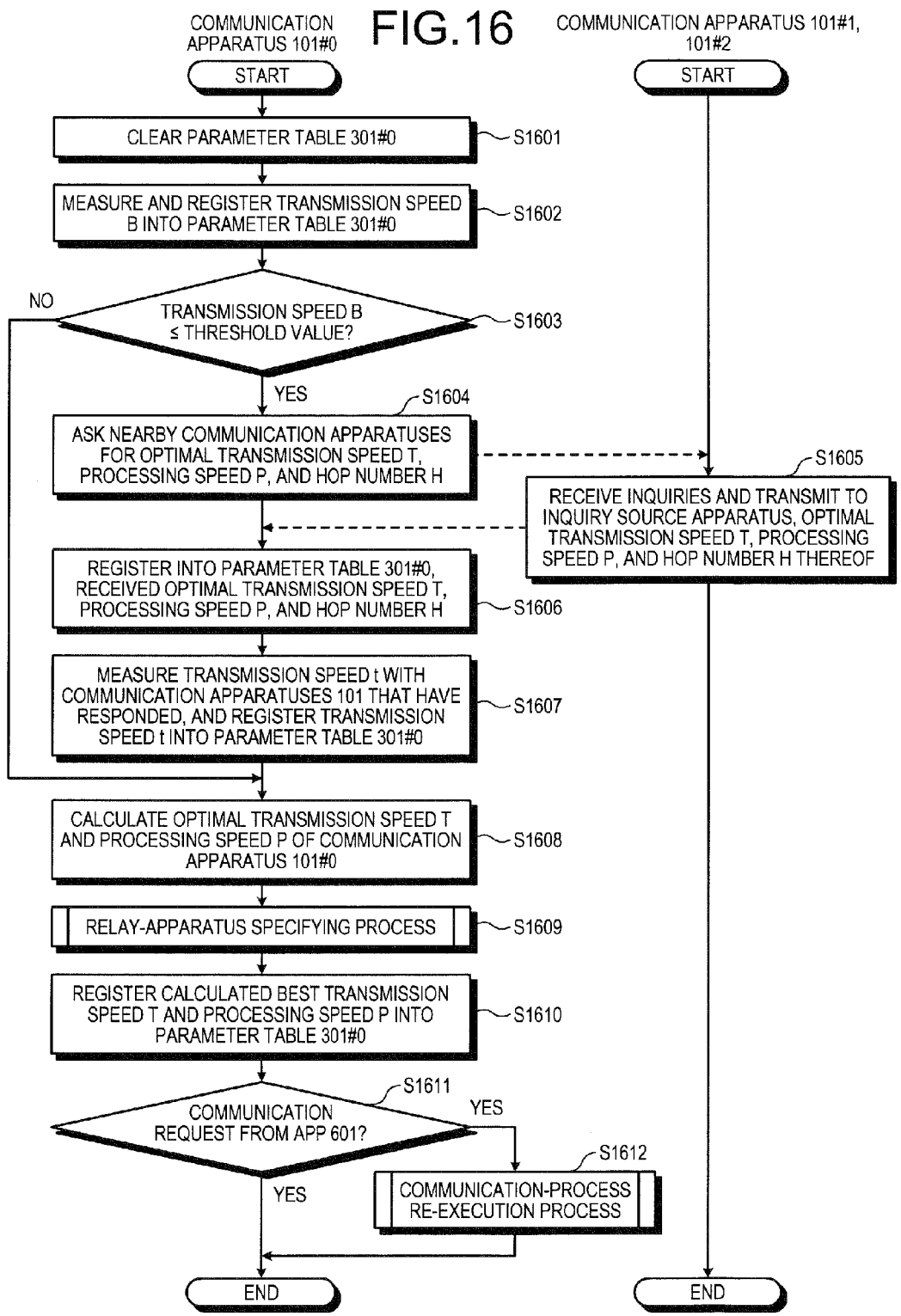
FIG. 16 is a flowchart of a parameter update process and the inquiry response process.

FIG. 16 is a flowchart of the parameter update process and the inquiry response process. Steps S1601 to S1604 and S1606 to S1612 represent the parameter update process and step S1605 represents the inquiry response process.

The communication apparatus 101#0 clears the parameter table 301#0 (step S1601). After the clearance, the communication apparatus 101#0 measures and registers the transmission speed B into the parameter table 301#0 (step S1602). After the registration, the communication apparatus 101#0 determines if the transmission speed B is equal to or less than a threshold value (step S1603). If the transmission speed B is equal to or less than the threshold value (step S1603: YES), the communication apparatus 101#0 makes inquiries to nearby communication apparatuses, for an optimal transmission speed T, the processing speed P, and the hop number H (step S1604). The communication apparatus 101#1 and the communication apparatus 101#2 each receives the inquiries and transmits to the inquiry source apparatus, an optimal transmission speed T, the processing speed P, and the hop number H thereof (step S1605). After the transmission, the communication apparatus 101#1 and the communication apparatus 101#2 terminate the inquiry response process.

The communication apparatus 101#0 registers into the parameter table 301#0, the received optimal transmission speed T, processing speed P, and hop number H (step S1606). After the registration, the communication apparatus 101#0 measures the transmission speed t with the communication apparatuses 101 that have responded, and registers the transmission speed t into the parameter table 301#0 (step S1607).

After the registration or if the transmission speed B is greater than the threshold value (step S1603: NO), the communication apparatus 101#0 calculates an optimal transmission speed T and the processing speed P of the communication apparatus 101#0 (step S1608). After the calculation, the communication apparatus 101#0 executes a relay-apparatus specifying process (step S1609). Details of the relay-apparatus specifying process will be described later with reference to FIG. 17. After the execution, the communication apparatus 101#0 registers the calculated best transmission speed T and processing speed P into the parameter table 301#0 (step S1610). After the registration, the communication apparatus 101#0 determines whether there is a communication request from the app 601 (step S1611).

If there is a communication request (step S1611: YES), the communication apparatus 101#0 executes the communication-process re-execution process (step S1612). After executing the communication-process re-execution process or if no communication request is made (step S1611: NO), the communication apparatus 101#0 terminates the parameter update process.

Figure 17:
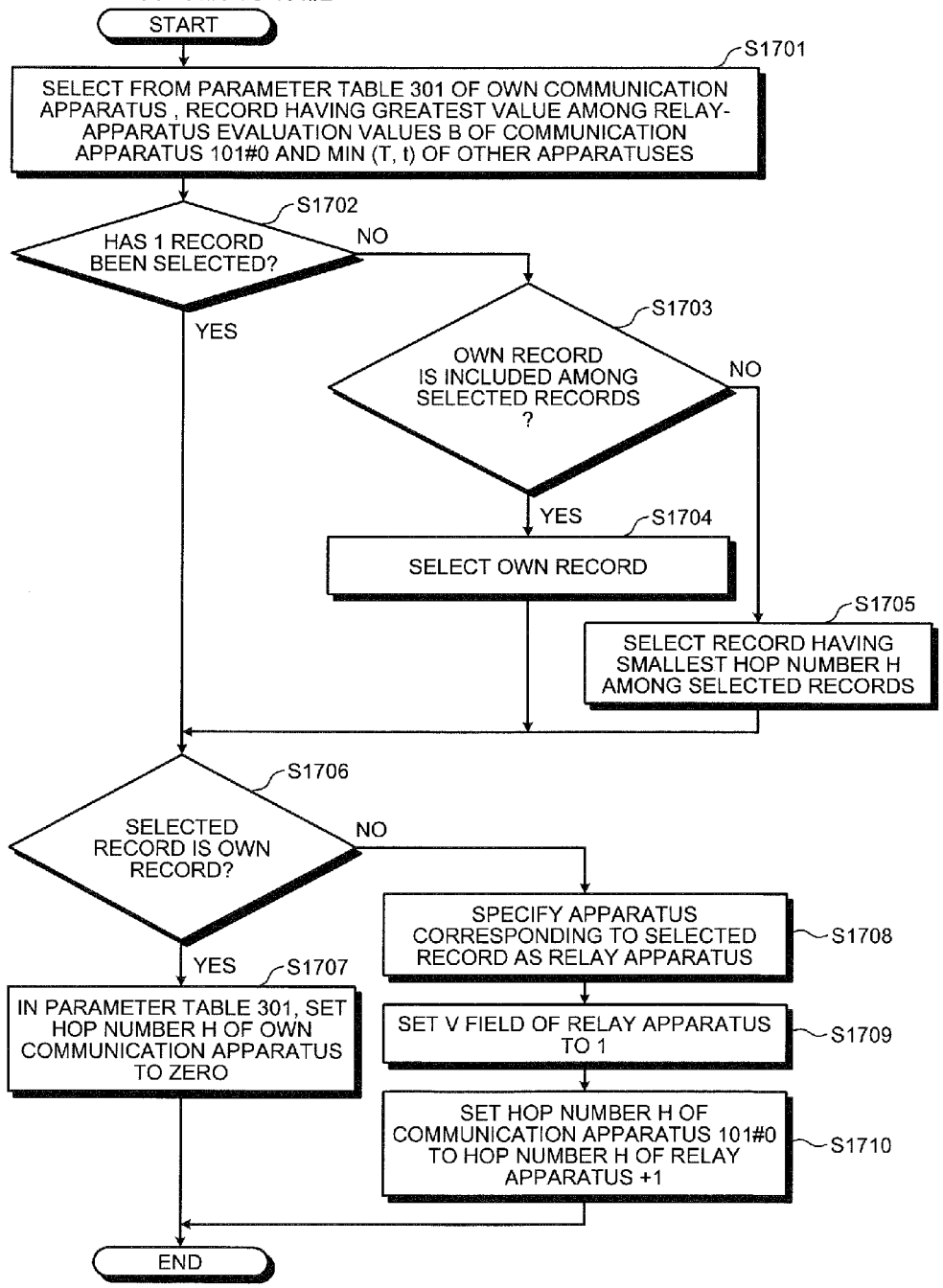
FIG. 17 is a flowchart of a relay-apparatus specifying process.

FIG. 17 is a flowchart of the relay-apparatus specifying process. Although the relay-apparatus specifying process is executed by the communication apparatuses 101#0 to 101#2, the communication apparatus 101#0 is described as the executing entity in the description of FIG. 17 for simplicity of description.

The communication apparatus 101#0 selects the record having the greatest value among the relay-apparatus evaluation value B of the communication apparatus 101#0 and Min(T, t) of the other apparatuses, from the parameter table 301 of the communication apparatus 101#0 (step S1701). If multiple records have the greatest value, the communication apparatus 101#0 selects all the records having a maximum value.

After the selection, the communication apparatus 101#0 determines whether one record has been selected (step S1702). If two or more records have been selected (step S1702: NO), the communication apparatus 101#0 determines whether the record of the communication apparatus 101#0 is included among the selected records (step S1703). If the record of the communication apparatus 101#0 is included (step S1703: YES), the communication apparatus 101#0 selects the record of the communication apparatus 101#0 (step S1704). If the record of the communication apparatus 101#0 is not included (step S1703: NO), the communication apparatus 101#0 selects the record having the smallest hop number H among the selected records (step S1705).

After completion of steps S1704 or S1705 or if one record has been selected (step S1702: YES), the communication apparatus 101#0 determines whether the selected record is the record of the communication apparatus 101#0 (step S1706). If the selected record is the record of the communication apparatus 101#0 (step S1706: YES), the communication apparatus 101#0 sets the hop number H of the communication apparatus 101#0 in the parameter table 301 to zero (step S1707) and terminates the relay-apparatus specifying process.

If the selected record is not the record of the communication apparatus 101#0 (step S1706: NO), the communication apparatus 101#0 specifies the apparatus corresponding to the selected record as the relay apparatus (step S1708) and sets the V field of the relay apparatus to one (step S1709). After the setting, the communication apparatus 101#0 sets the hop number H of the communication apparatus 101#0 to the hop number H of the relay apparatus+1 (step S1710) and terminates the relay-apparatus specifying process.

Figure 18:
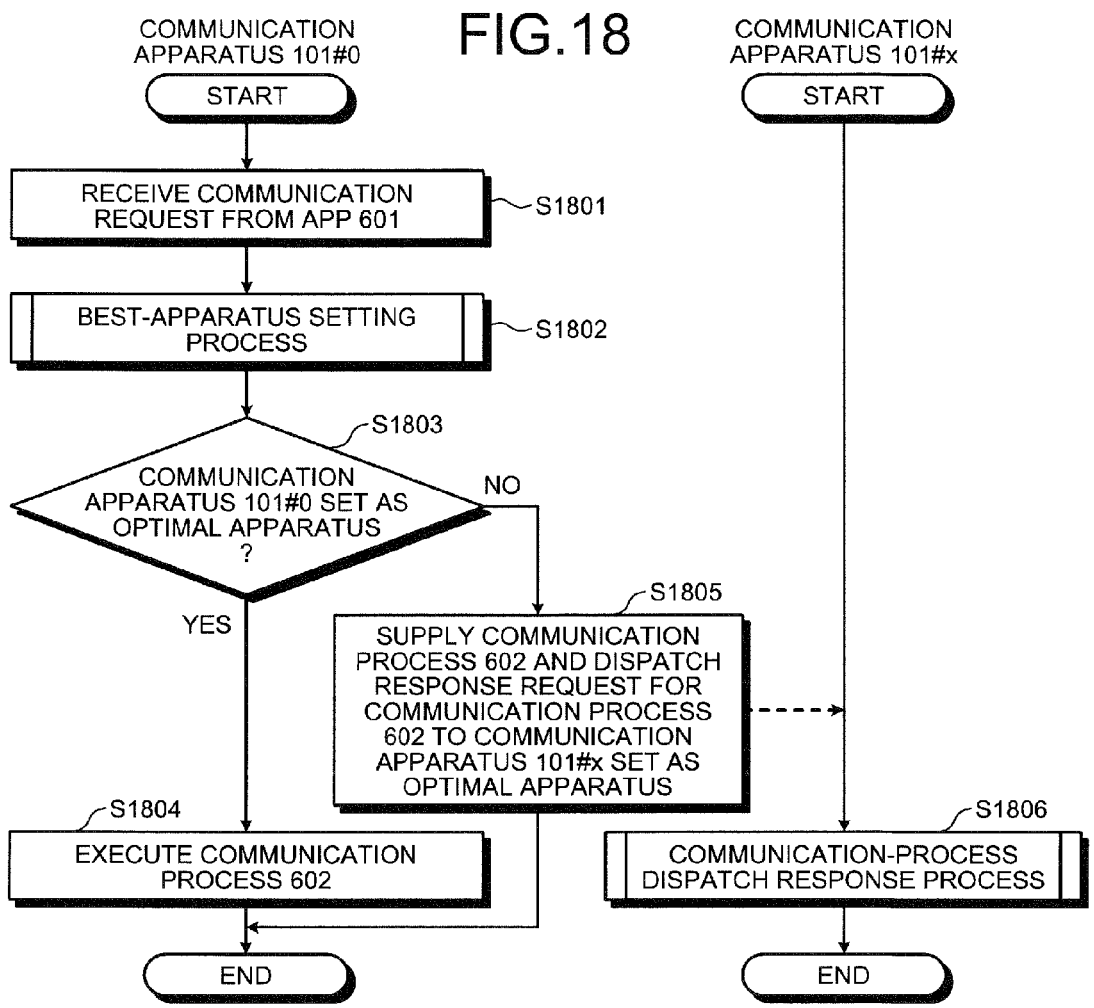
FIG. 18 is a flowchart of a communication-process execution process.

FIG. 18 is a flowchart of the communication-process execution process. The communication apparatus 101#0 receives a communication request from the app 601 (step S1801). After the receipt, the communication apparatus 101#0 executes a best-apparatus setting process (step S1802).

Details of an optimal-apparatus setting process will be described later with reference to FIG. 19. After the execution of an optimal-apparatus setting process, the communication apparatus 101#0 determines whether the communication apparatus 101#0 is set as an optimal apparatus (step S1803). If the communication apparatus 101#0 is set as an optimal apparatus (step S1803: YES), the communication apparatus 101#0 executes the communication process 602 by itself (step S1804) and terminates the communication-process execution process.

If the communication apparatus 101#0 is not set as an optimal apparatus (step S1803: NO), the communication apparatus 101#0 supplies the communication process 602 and a dispatch response request for the communication process 602 to a communication apparatus 101#x set as an optimal apparatus (step S1805). The communication apparatus 101 defined as the communication apparatus 101#x is either the communication apparatus 101#1 or the communication apparatus 101#2. After the supply, the communication apparatus 101#0 terminates the communication-process execution process. The communication apparatus 101#x receiving the supply executes the communication-process dispatch response process (step S1806).

Figure 19:
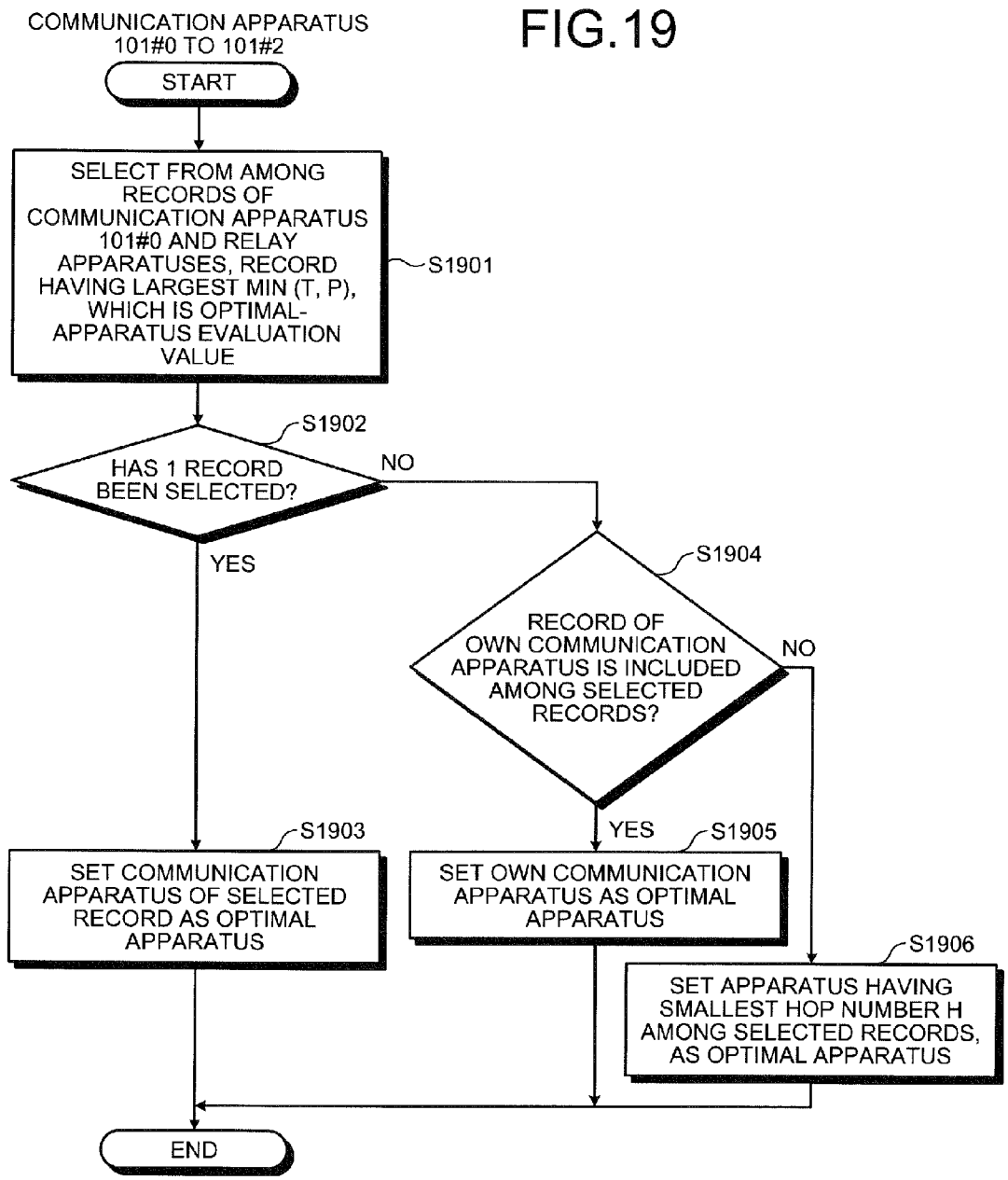
FIG. 19 is a flowchart of an optimal-apparatus setting process.

FIG. 19 is a flowchart of an optimal-apparatus setting process. Although an optimal-apparatus setting process is executed by the communication apparatuses 101#0 to 101#2, the communication apparatus 101#0 is described as the executing entity in the description of FIG. 19 for simplicity of description. In an optimal-apparatus setting process, the communication apparatus executes the process for its own parameter table 301.

The communication apparatus 101#0 selects from among the records of the communication apparatus 101#0 and the relay apparatuses, the record having largest Min(T, P), which is an optimal-apparatus evaluation value (step S1901). After the selection, the communication apparatus 101#0 determines whether one record has been selected (step S1902). If one record has been selected (step S1902: YES), the communication apparatus 101#0 sets the communication apparatus of the selected record as an optimal apparatus (step S1903) and terminates an optimal-apparatus setting process.

If two or more records have been selected (step S1902: NO), the communication apparatus 101#0 determines whether the record of the communication apparatus 101#0 is included among the selected records (step S1904). If the record of the communication apparatus 101#0 is included (step S1904: YES), the communication apparatus 101#0 sets the communication apparatus 101#0 as an optimal apparatus (step S1905) and terminates an optimal-apparatus setting process. If record of the communication apparatus 101#0 is not included (step S1904: NO), the communication apparatus 101#0 sets the apparatus having the smallest hop number H as an optimal apparatus among the selected records (step S1906) and terminates an optimal-apparatus setting process.

Figure 20:
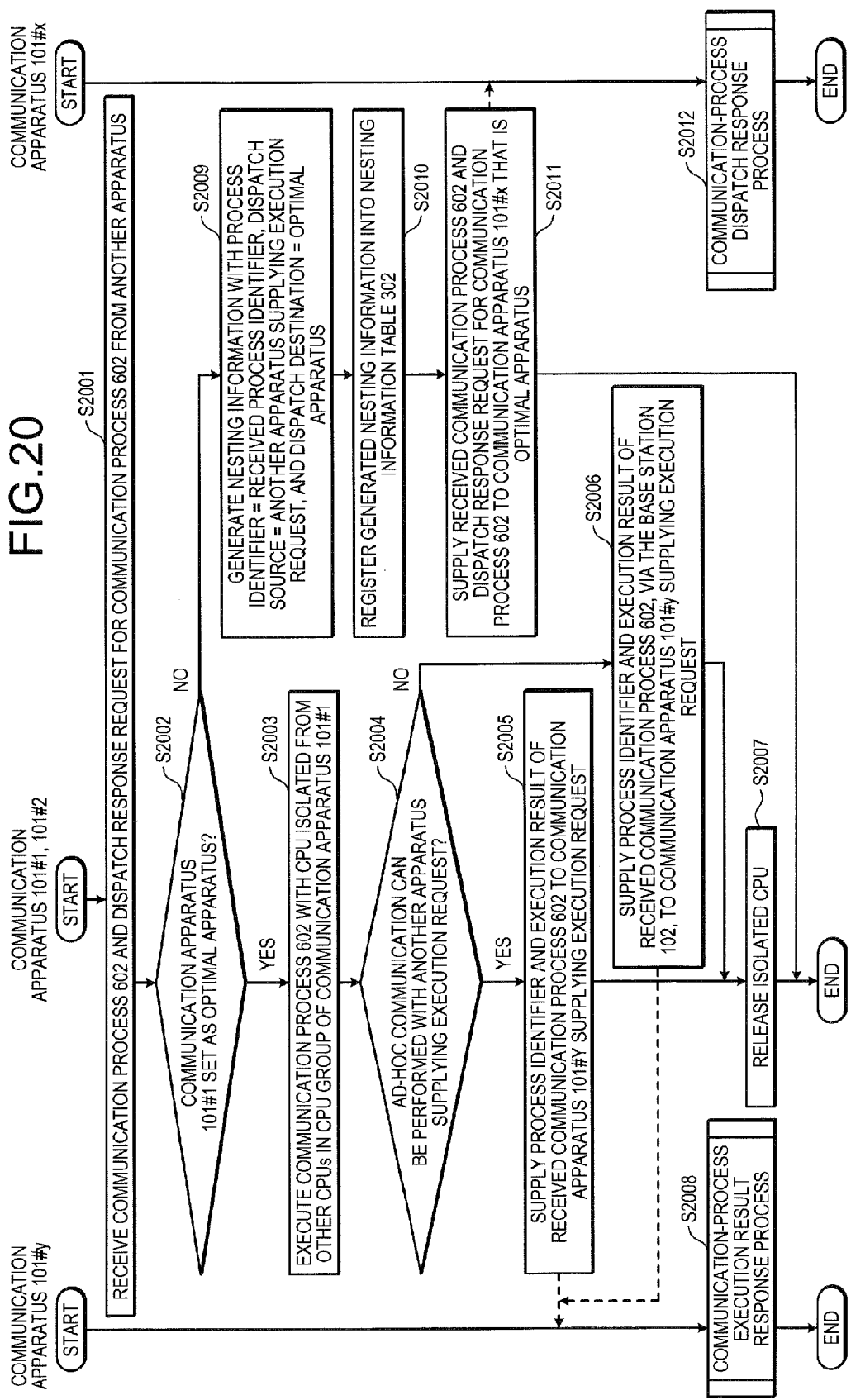
FIG. 20 is a flowchart of a communication-process dispatch response process.

FIG. 20 is a flowchart of the communication-process dispatch response process. Although the communication-process dispatch response process is executed by the communication apparatuses 101#1 and 101#2, the communication apparatus 101#1 is described as the executing entity in the description of FIG. 20 for simplicity of description.

The communication apparatus 101#1 receives the communication process 602 and a dispatch response request for the communication process 602 from another apparatus (step S2001). After the receipt, the communication apparatus 101#1 determines whether the communication apparatus 101#1 is set as an optimal apparatus (step S2002). If not set as an optimal apparatus, the communication apparatus 101#1 executes an optimal-apparatus setting process.

If the communication apparatus 101#1 is set as an optimal apparatus (step S2002: YES), the communication apparatus 101#1 executes the communication process 602 with a CPU isolated from the other CPUs in the CPU group of the communication apparatus 101#1 (step S2003). The term "isolated" refers to a process of dividing a memory space etc., for operation. As a result, the application group operated by a user of the communication apparatus 101#1 cannot access the dispatched communication process 602 and the security can be maintained.

After the execution of the communication process 602, the communication apparatus 101#1 determines whether ad-hoc communication can be performed with another apparatus supplying the execution request (step S2004). If the ad-hoc communication can be performed (step S2004: YES), the communication apparatus 101#1 supplies the process identifier and the execution result of the received communication process 602 to a communication apparatus 101#y supplying the execution request (step S2005). If the executing entity is the communication apparatus 101#1, the communication apparatus 101 defined as the communication apparatus 101#y is either the communication apparatus 101#0 executing the app 601 or the communication apparatus 101#2 defined as an optimal apparatus for the communication apparatus 101#0.

If the ad-hoc communication cannot be performed (step S2004: NO), the communication apparatus 101#1 supplies the process identifier and the execution result of the received communication process 602, via the base station 102, to the communication apparatus 101#y supplying the execution request (step S2006). After supplying the process identifier and the execution result, the communication apparatus 101#1 releases the isolated CPU (step S2007) and terminates the communication-process dispatch response process. The communication apparatus 101#y receiving the supply executes the communication-process execution result response process (step S2008).

If the communication apparatus 101#1 is not set as an optimal apparatus (step S2002: NO), the communication apparatus 101#1 generates nesting information with the process identifier=the received process identifier, the dispatch source=another apparatus supplying the execution request, and the dispatch destination=an optimal apparatus (step S2009). After the generation, the communication apparatus 101#1 registers the generated nesting information into the nesting information table 302 (step S2010). After the registration, the communication apparatus 101#1 supplies the received communication process 602 and a dispatch response request for the communication process 602 to the communication apparatus 101#x that is an optimal apparatus (step S2011) and terminates the communication-process dispatch response process. The communication apparatus 101#x receiving the supply executes the communication-process dispatch response process (step S2012).

Figure 21:
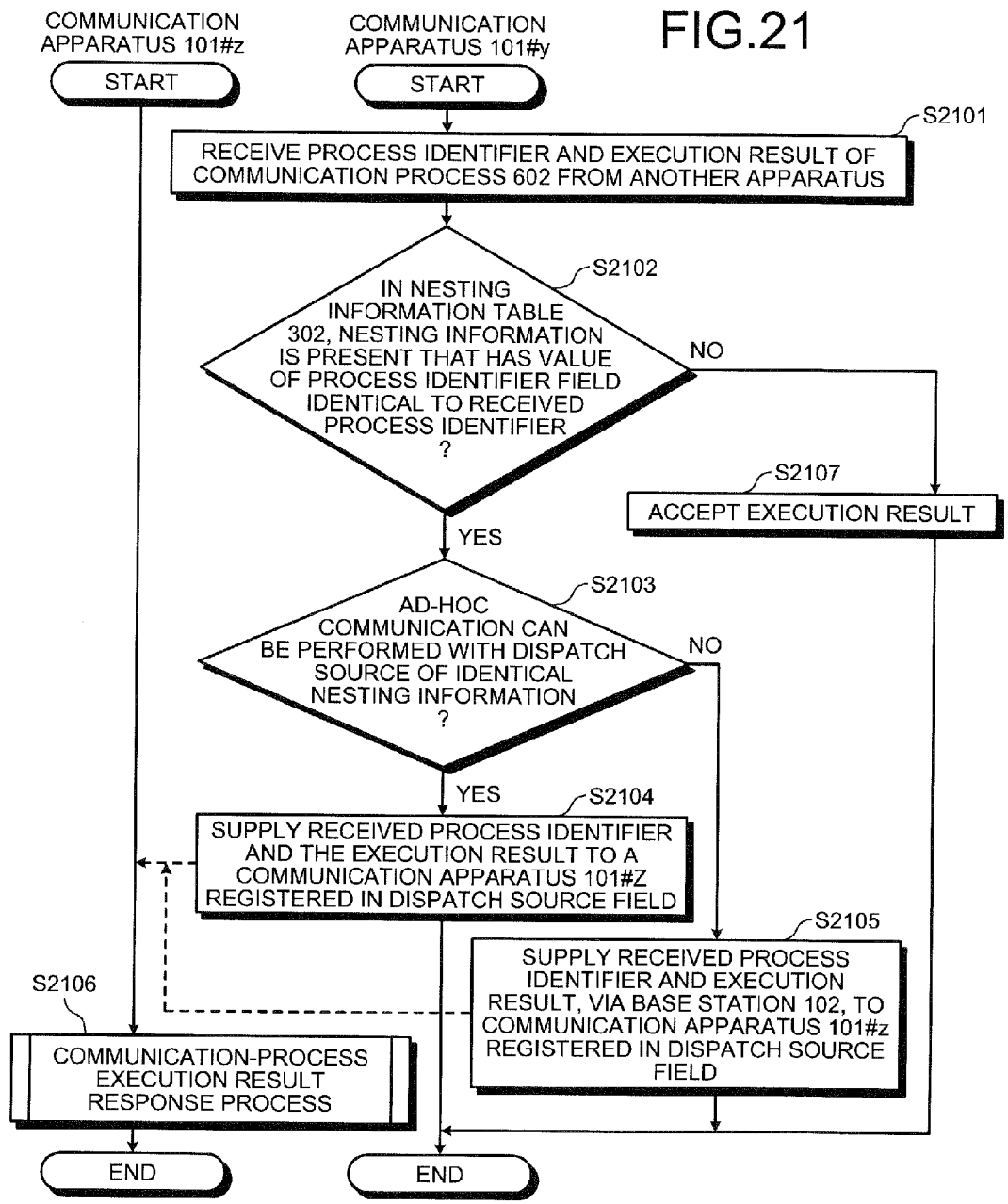
FIG. 21 is a flowchart of a communication-process execution result response process.

FIG. 21 is a flowchart of the communication-process execution result response process. In the description of FIG. 21, it is assumed that the communication apparatus 101#y described in FIG. 20 is the executing entity executing the communication-process execution result response process.

The communication apparatus 101#y receives the process identifier and the execution result of the communication process 602 from another apparatus (step S2101). After the receipt, the communication apparatus 101#y determines whether nesting information is present that has a value of the process identifier field identical to the received process identifier, in the nesting information table 302 (step S2102). If present (step S2102: YES), the communication apparatus 101#y determines whether ad-hoc communication can be performed with the dispatch source of the identical nesting information (step S2103). If the ad-hoc communication can be performed (step S2103: YES), the communication apparatus 101#y supplies the received process identifier and the execution result to a communication apparatus 101#z registered in the dispatch source field (step S2104). After the supply, the communication apparatus 101#y terminates the communication-process execution result response process.

If the ad-hoc communication cannot be performed (step S2013: NO), the communication apparatus 101#y supplies the received process identifier and the execution result, via the base station 102, to the communication apparatus 101#z registered in the dispatch source field (step S2105). After the supply, the communication apparatus 101#y terminates the communication-process execution result response process. The communication apparatus 101#z receiving the supply executes the communication-process execution result response process (step S2106).

If not present (step S2102: NO), the execution result is an execution result corresponding to the application of the communication apparatus 101#y and, therefore, the communication apparatus 101#y accepts the execution result (step S2107) and terminates the communication-process execution result response process.

Figure 22:
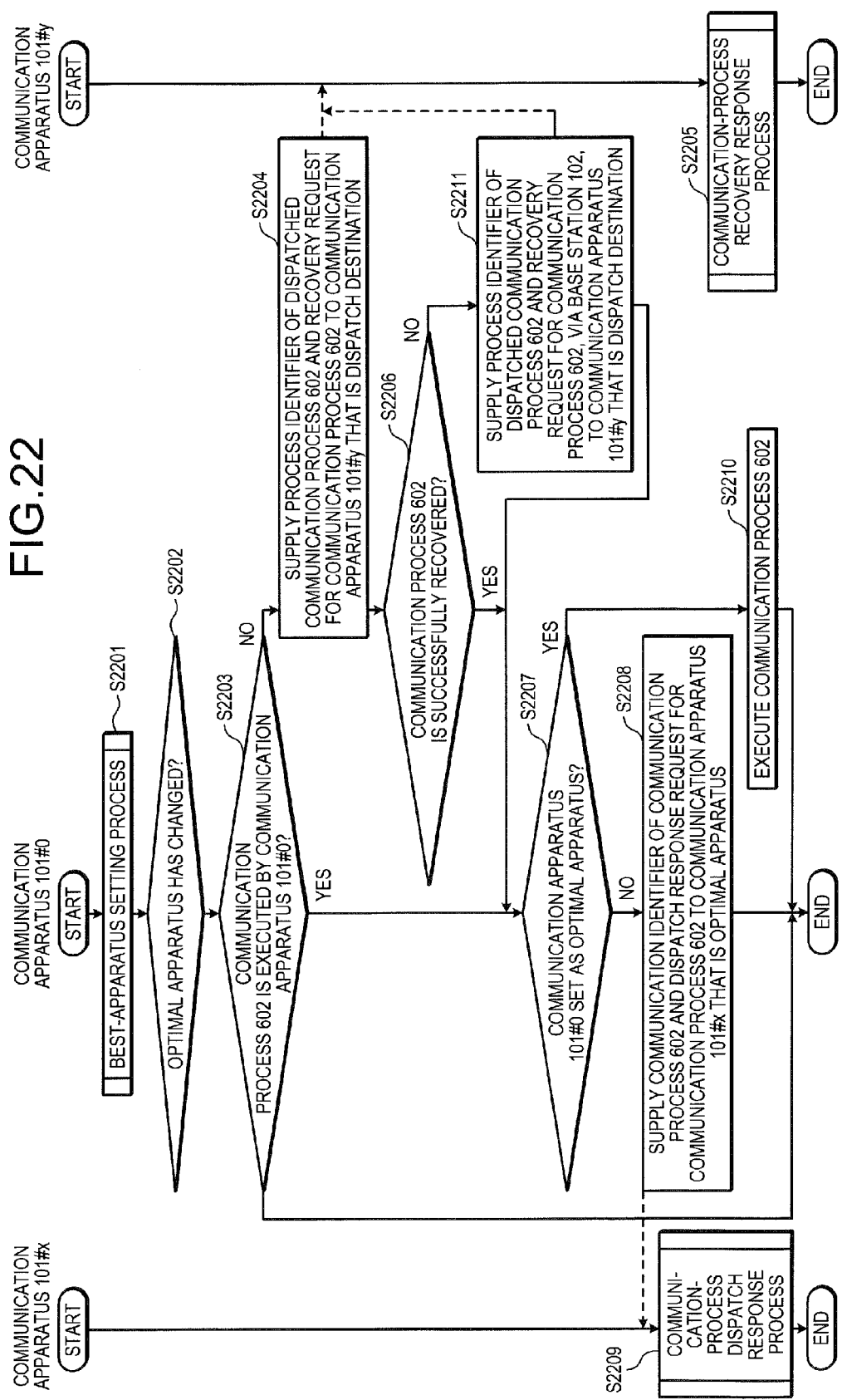
FIG. 22 is a flowchart of a communication-process re-execution process.

FIG. 22 is a flowchart of the communication-process re-execution process. The communication apparatus 101#0 executes an optimal-apparatus setting process (step S2201). After the setting, the communication apparatus 101#0 determines whether an optimal apparatus has changed (step S2202). If an optimal apparatus is not changed (step S2202: NO), the communication apparatus 101#0 terminates the communication-process re-execution process.

If an optimal apparatus is changed (step S2202: YES), the communication apparatus 101#0 determines whether the communication process 602 is executed by the communication apparatus 101#0 (step S2203). If the communication process 602 is not executed by the communication apparatus 101#0 (step S2203: NO), the communication apparatus 101#0 supplies the process identifier of the dispatched communication process 602 and a recovery request for the communication process 602 to the communication apparatus 101#y that is the dispatch destination (step S2204). The communication apparatus 101#y receiving the supply executes the communication-process recovery response process (step S2205).

After a certain time has elapsed from the supply, the communication apparatus 101#0 determines whether the communication process 602 is successfully recovered (step S2206). If the communication process 602 is executed by the communication apparatus 101#0 (step S2203: YES) or if successfully recovered (step S2206: YES), the communication apparatus 101#0 determines whether the communication apparatus 101#0 is set as an optimal apparatus (step S2207). If the communication apparatus 101#0 is not set as an optimal apparatus (step S2207: NO), the communication apparatus 101#0 supplies the communication identifier of the communication process 602 and a dispatch response request for the communication process 602 to the communication apparatus 101#x that is an optimal apparatus (step S2208). After the supply, the communication apparatus 101#0 terminates the communication-process re-execution process. The communication apparatus 101#x receiving the supply executes the communication-process dispatch response process (step S2209).

If the communication apparatus 101#0 is set as an optimal apparatus (step S2207: YES), the communication apparatus 101#0 executes the communication process 602 by itself (step S2210) and terminates the communication-process re-execution process. If failing in the recovery (step S2206: NO), the communication apparatus 101#0 supplies the process identifier of the dispatched communication process 602 and a recovery request for the communication process 602 via the base station 102 to the communication apparatus 101#y that is the dispatch destination (step S2211). The case of failing in the recovery includes, for example, the case of accepting a recovery failure and the case of the absence of acceptance of a response after a certain time has elapsed. After a certain time has elapsed from the supply, the communication apparatus 101#0 determines whether the communication apparatus 101#0 is set as an optimal apparatus (step S2207).

Figure 23:
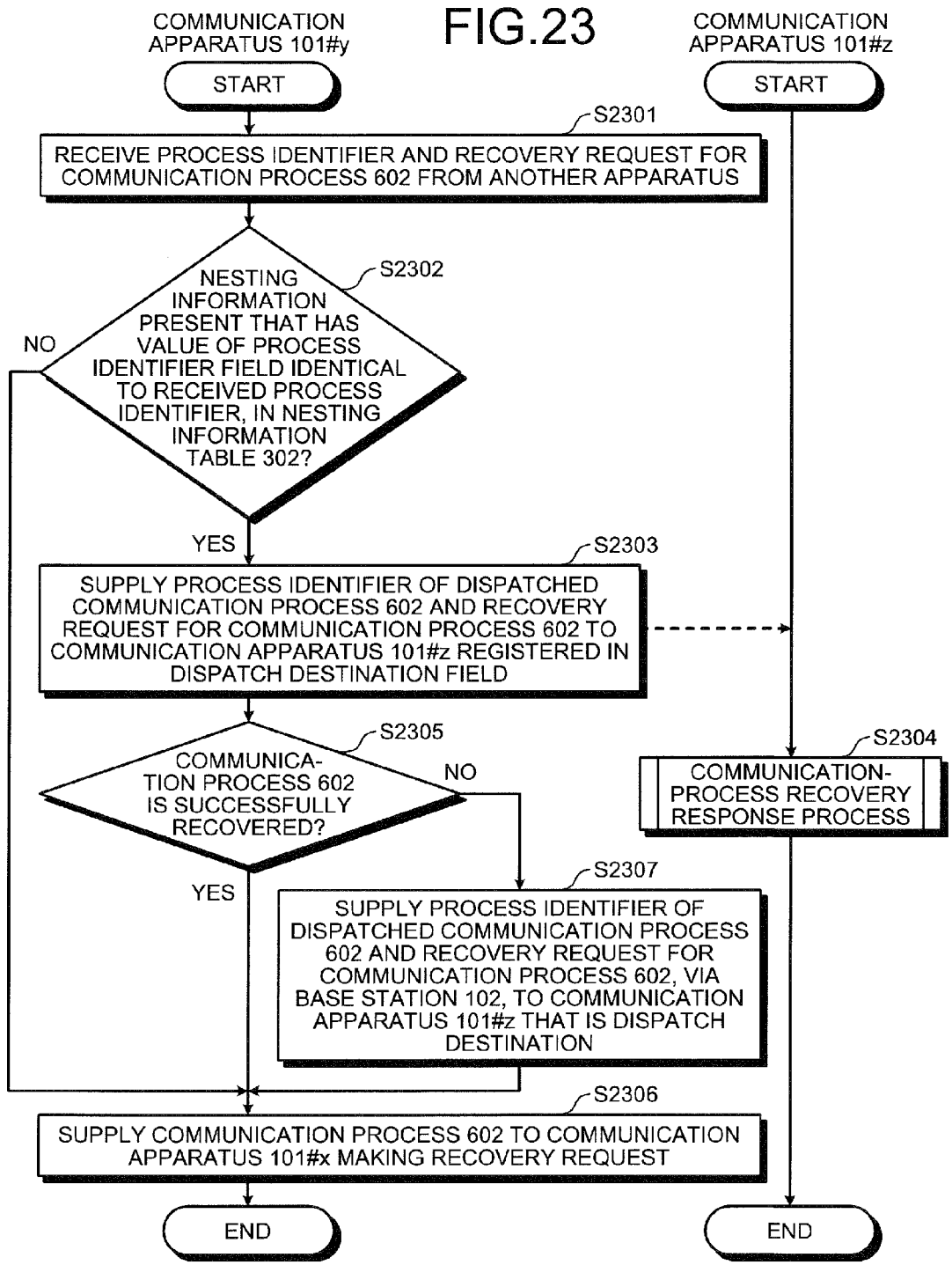
FIG. 23 is a flowchart of a communication-process recovery response process.

FIG. 23 is a flowchart of the communication-process recovery response process. In the description of FIG. 23, it is assumed that the communication apparatus 101#y described in FIG. 22 is the executing entity executing the communication-process recovery response process.

The communication apparatus 101#y receives the process identifier and the recovery request for the communication process 602 from another apparatus (step S2301). After the receipt, the communication apparatus 101#y determines whether nesting information is present that has a value of the process identifier field identical to the received process identifier, in the nesting information table 302 (step S2302). If present (step S2302: YES), the communication apparatus 101#y supplies the process identifier of the dispatched communication process 602 and the recovery request for the communication process 602 to the communication apparatus 101#z registered in the dispatch destination field (step S2303). The communication apparatus 101#z receiving the supply executes the communication-process recovery response process (step S2304).

After a certain time has elapsed from the supply, the communication apparatus 101#y determines whether the communication process 602 is successfully recovered (step S2305). If successfully recovered (step S2305: YES), the communication apparatus 101#y supplies the communication process 602 to the communication apparatus 101#x making the recovery request (step S2306) and terminates the communication-process recovery response process. If the nesting information does not exist (step S2302: NO), the communication process 602 is executed by the communication apparatus 101#y and, therefore, the communication apparatus 101#y goes to the process of step S2306. If failing in the recovery (step S2305: NO), the communication apparatus 101#y supplies the process identifier of the dispatched communication process 602 and the recovery request for the communication process 602, via the base station 102, to the communication apparatus 101#z that is the dispatch destination (step S2307). After a certain time has elapsed from the supply, the communication apparatus 101#y supplies the communication process 602 to the communication apparatus 101#x making the recovery request (step S2306) and terminates the communication-process recovery response process.

As described above, according to the communication apparatus and the communicating method, whether a communication process is executed by the apparatus or another apparatus is determines based on a transmission speed between the apparatus and a base station and a transmission speed via the other apparatus based on a transmission speed between the apparatus and the other apparatus and a transmission speed between the other apparatus and the base station. As a result, the communication apparatus can select the optimum communication channel out of the communication channels to the base station and execute the communication process at higher speed.

The communication apparatus may periodically collect the processing speeds of another apparatus. The communication apparatus is often moving and the transmission speed between the apparatus and the base station changes from moment to moment. The communication apparatus can periodically collect the ever-changing transmission speed so as to always select the optimum communication channel and the apparatus executing the communication process.

The communication apparatus may determine whether a communication process is executed by the apparatus or another apparatus, based on the transmission speed between the apparatus and the base station and the processing speed of the apparatus as well as the transmission speeds via the other apparatus and the processing speed of the other apparatus. As a result, the communication apparatus can transfer a communication process executed by itself to another apparatus having a lower load so as to distribute a load.

The communication apparatus may recover an execution result of a communication process. As a result, an application generating the communication process can continue the process without being aware of whether the communication process is executed by its own apparatus or another apparatus.

The communication apparatus may specify a communication channel with a higher speed as a specific communication channel out of a first communication channel from the apparatus to the base station and a second communication channel from the apparatus via another apparatus to the base station and may control the other apparatus such that communication is performed via the specific communication channel. As a result, the communication apparatus can select a faster communication channel for communicating with the base station.

The communication apparatus may specify the specific communication channel based on the number of the other apparatuses present in a communication channel. As a result, the communication apparatus can select a shorter communication channel to minimize the communication channel.

In the communication system 100 according to the first embodiment, a smaller value between a transmission speed and a processing speed is set as an optimal-apparatus evaluation value. However, some applications have a considerable requirement for the CPU processing speed and only require a lower transmission speed. Therefore, the communication system 100 according to a second embodiment sets an optimal-apparatus evaluation value depending on whether an application requires the CPU processing speed or the transmission speed. Hardware of the communication apparatuses 101#0 to 101#2 according to the second embodiment is equivalent to the hardware according to the first embodiment and therefore will not be described.

Figure 24:
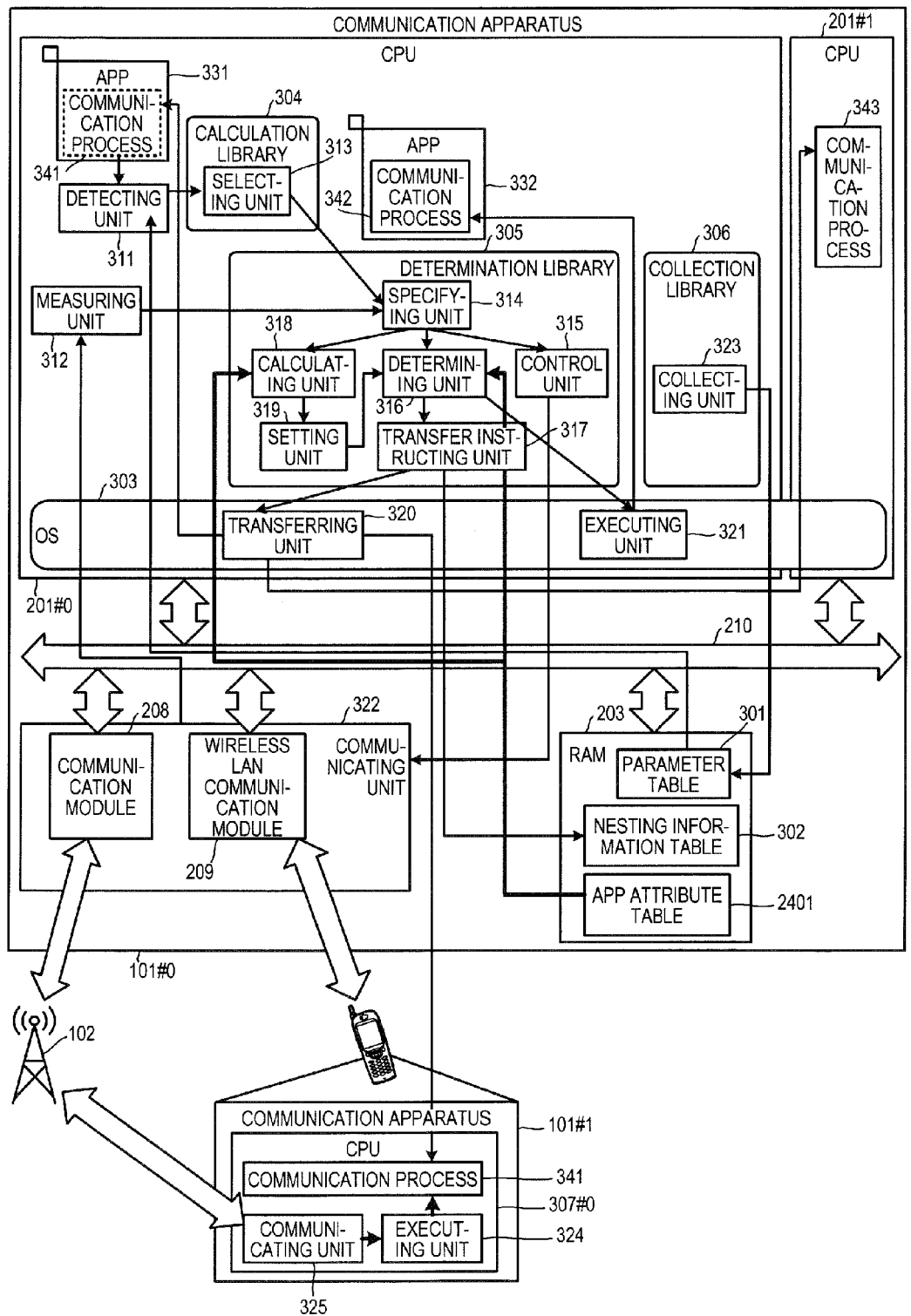
FIG. 24 is an explanatory view of functions of the communication system 100 according to the second embodiment.

FIG. 24 is an explanatory view of functions of the communication system 100 according to the second embodiment. The functions of the detecting unit 311 to the executing unit 324 according to the second embodiment except the determining unit 316 and the calculating unit 318 are equivalent to the functions of the first embodiment and therefore will not be described. Similarly, the parameter table 301 and the nesting information table 302 according to the second embodiment store information equivalent to the parameter table 301 and the nesting information table 302 according to the first embodiment and therefore will not be described.

The communication system 100 according to the second embodiment can access an application attribute table 2401. The application attribute table 2401 is a table storing a requirement level of the transmission speed to the base station 102 and a requirement level of the processing speed at which the communication process can be executed for each application. Details of the application attribute table 2401 will be described later with reference to FIG. 25.

The determining unit 316 may determine whether a communication process is transferred to another apparatus, based on an attribute of an application that is the generation source of the communication process. For example, it is assumed that the storage contents in the application attribute table 2401 indicate that the application 331 generating the communication process 341 is an application requiring the processing speed. In this case, the determining unit 316 determines that the communication process 341 is transferred to the apparatus having the highest processing speed between the communication apparatus 101#1 and the communication apparatus 101#2. The determination result is stored into a storage area such as a register of the CPU 201#0, a cache memory, and the RAM 203.

The calculating unit 318 may calculate an evaluation value based on an attribute of an application that is the generation source of the communication process. For example, if the application 331 generating the communication process 341 is an application requiring the processing speed, the calculating unit 318 calculates the evaluation value as a value of the processing speed. The calculation result is stored into a storage area such as a register of the CPU 201#0, a cache memory, and the RAM 203.

FIG. 25 is an explanatory view of an example of storage contents of the application attribute table 2401 according to the second embodiment. The application attribute table 2401 includes three fields of an application name, a CPU processing speed requirement, and a transmission speed requirement. The application name field stores information enabling unique identification of an object application such as a name of an application.

The CPU processing speed requirement field stores whether an object application has a higher requirement for the CPU processing speed. For example, the CPU processing speed requirement field stores either an identifier "HIGH" indicative of a higher requirement or an identifier "LOW" indicative of a lower requirement. The transmission speed requirement field stores whether an object application has a higher requirement for the transmission speed. For example, the transmission speed requirement field stores either an identifier "HIGH" indicative of a higher requirement or an identifier "LOW" indicative of a lower requirement. In the following description, the CPU processing speed requirement and the transmission speed requirement are collectively referred to as an application attribute.

For example, a mailer application does not require a complicated process, has a smaller communication volume, and therefore has the application attribute set to "LOW" for both the CPU processing speed requirement and the transmission speed requirement. In the case of a downloader application, although a complicated process is not required, a communication volume is preferably larger. Therefore, the application attribute of the downloader application is set to "LOW" for the CPU processing speed requirement and "HIGH" for the transmission speed requirement.

In the case of a network game application, although a communication volume may be smaller, a complicated process is executed by using a result acquired from a communication process. Therefore, the application attribute of the network game application is set to "HIGH" for the CPU processing speed requirement and "LOW" in the transmission speed requirement field. In the case of a streaming video reproduction application, a communication volume is preferably larger and a complicated process such as a decoding process is executed for a result acquired from a communication process. Therefore, the application attribute of the streaming video reproduction application is set to "HIGH" for both the CPU processing speed requirement and the transmission speed requirement.

If a highly compressed video is received for the streaming video reproduction application, the transmission speed can be lowered while the processing amount of a decompression process increases. In such a case, the application attribute of the streaming video reproduction application may be set to "HIGH" for the CPU processing speed requirement and "LOW" for the transmission speed requirement.

The communication system 100 according to the second embodiment refers to the application attribute table 2401 to execute the communication process. The communication system 100 according to the second embodiment executes all the processes of the process group depicted in FIGS. 16 to 23 equivalent to the communication process 100 according to the first embodiment except an optimal-apparatus setting process. An optimal-apparatus setting process according to the second embodiment will be described with reference to FIG. 26.

Figure 26:
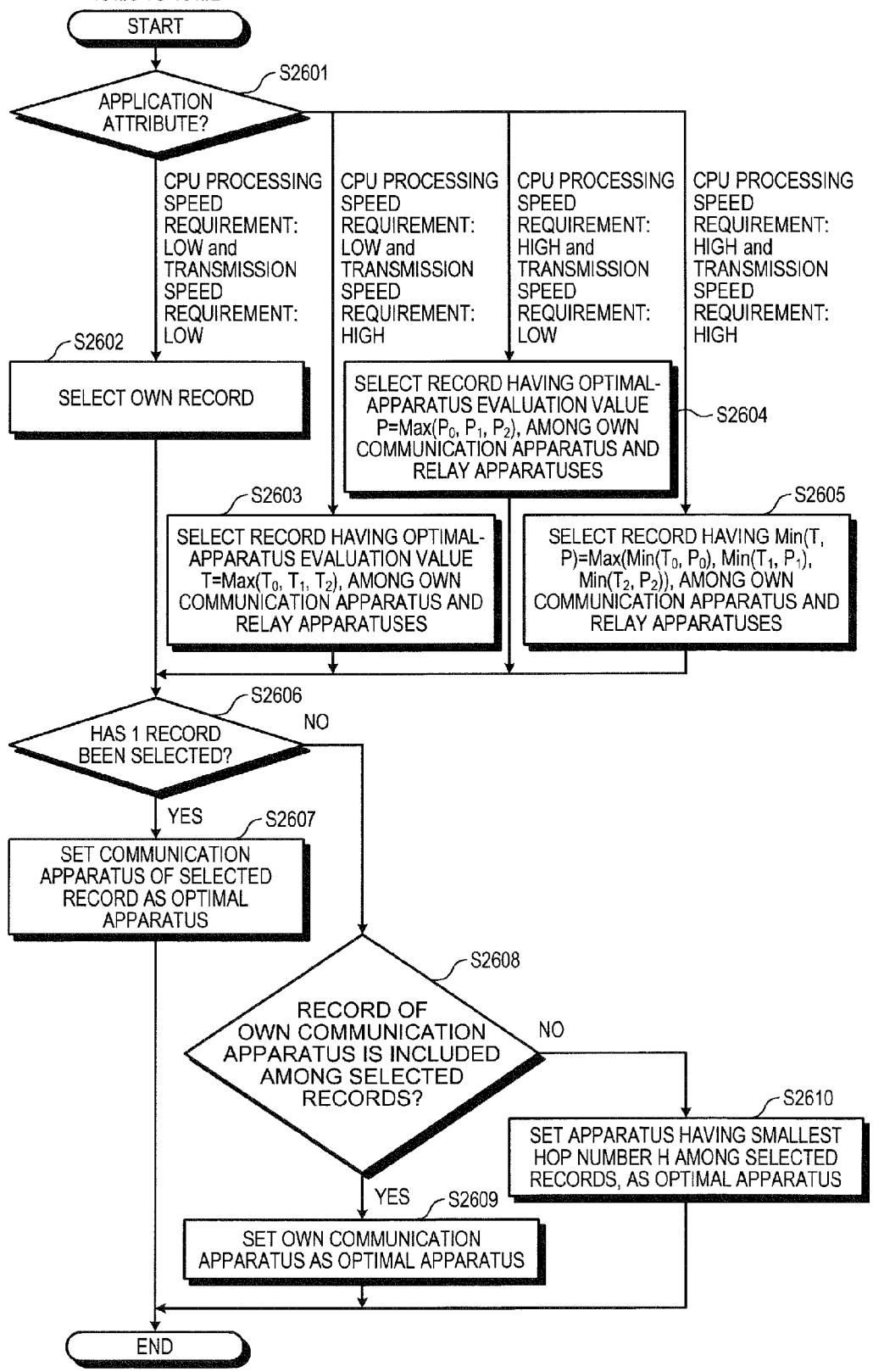
FIG. 26 is a flowchart of an optimal-apparatus setting process according to the second embodiment.

FIG. 26 is a flowchart of an optimal-apparatus setting process according to the second embodiment. In an optimal-apparatus setting process according to the second embodiment, steps S2606 to S2610 are executed as the process equivalent to steps S1902 to S1906 depicted in FIG. 19 and therefore will not be described. Although an optimal-apparatus setting process according to the second embodiment is executed by the communication apparatuses 101#0 to 101#2, the communication apparatus 101#0 is described as the executing entity in the description of FIG. 26 for simplicity of description. In an optimal-apparatus setting process according to the second embodiment, the communication apparatus executes the process for its own parameter table 301.

The communication apparatus 101#0 refers to the application attribute table 2401 to check the application attribute of the object application (step S2601). If both the CPU processing speed requirement and the transmission speed requirement are low (step S2601: CPU PROCESSING SPEED REQUIREMENT: LOW and TRANSMISSION SPEED REQUIREMENT: LOW), the communication apparatus 101#0 selects the record of the communication apparatus 101#0 (step S2602) and goes to the process of step S2606.

If the CPU processing speed requirement is low and the transmission speed requirement is high (step S2601: CPU PROCESSING SPEED REQUIREMENT: LOW and TRANSMISSION SPEED REQUIREMENT: HIGH), the communication apparatus 101#0 selects a record having an optimal-apparatus evaluation value T=Max($T_0$, $T_1$, $T_2$) out of the communication apparatus 101#0 and the relay apparatuses (step S2603). After the selection, the communication apparatus 101#0 goes to the process of step S2606.

If the CPU processing speed requirement is high and the transmission speed requirement is low (step S2601: CPU PROCESSING SPEED REQUIREMENT: HIGH and TRANSMISSION SPEED REQUIREMENT: LOW), the communication apparatus 101#0 selects a record having an optimal-apparatus evaluation value P=Max($P_0$, $P_1$, $P_2$) out of the communication apparatus 101#0 and the relay apparatuses (step S2604). After the selection, the communication apparatus 101#0 goes to the process of step S2606.

If both the CPU processing speed requirement and the transmission speed requirement are high (step S2601: CPU PROCESSING SPEED REQUIREMENT: HIGH and TRANSMISSION SPEED REQUIREMENT: HIGH), the communication apparatus 101#0 selects the record having Min(T, P)=Max(min($T_0$, $P_0$), Min($T_2$, $P_1$), Min($T_2$, $P_2$)) out of the communication apparatus 101#0 and the relay apparatuses (step S2605). After the selection, the communication apparatus 101#0 goes to the process of step S2606.

As described above, according to the communication apparatus and the communicating method of the second embodiment, whether a communication process is transferred is determined based on the application attribute. As a result, the communication apparatus can assign the communication process to an apparatus optimum for the attribute required for the application.

For example, it is assumed that an application 1 requires the processing speed while an application 2 requires the transmission speed and it is also assumed that a communication apparatus 1 has a moderate processing speed and a moderate transmission speed, that a communication apparatus 2 has a low processing speed and a high transmission speed, and that a communication apparatus 3 has a high processing speed and a low transmission speed. In this case, the communication system 100 according to the first embodiment transfers both the communication process of the application 1 and the communication process of the application 2 to the communication apparatus 1. As described above, the communication system 100 according to the first embodiment selects the communication apparatus 1 regardless of the presence of the communication apparatus 3 suitable for executing the communication process of the application 1 and the communication apparatus 2 suitable for executing the communication process of the application 2.

However, the communication system according to the second embodiment transfers the communication process of the application 1 to the communication apparatus 3 and the communication process of the application 2 to the communication apparatus 2. As described above, the communication system according to the second embodiment can assign the communication processes to the apparatuses suitable for the attributes required for the respective applications.

If a transmission speed required for an application is greater than an optimal transmission speed T of the communication apparatus 101#0 in the communication channel, the communication system 100 according to the first and second embodiments cannot completely satisfy the requirement of the application. The communication system 100 according to a third embodiment distributes the communication process to multiple communication apparatuses 101 for execution, thereby satisfying the requirement of the application.

Hardware of the communication apparatuses 101#0 to 101#2 according to the third embodiment is equivalent to the hardware according to the first embodiment and therefore will not be described. The functions of the communication system 100 according to the third embodiment are substantially equivalent to the functions of the communication system 100 according to the second embodiment and therefore are not depicted. The Functions of the third embodiment will hereinafter be described.

The application attribute table according to the third embodiment is formed by adding a field storing a transmission speed required for an application to the application attribute table 2401 according to the second embodiment. For description of the application attribute table according to the third embodiment, an application attribute table 2801 according to the third embodiment will be described with reference to FIG. 28.

If the transmission speed of the specific communication channel is lower than the transmission speed required for the application generating the communication process in reference to the application attribute table 2801, the specifying unit 314 may specify a new specific communication channel from communication channels other than the specific communication channel. For example, it is assumed that the specifying unit 314 has specified the communication channel for communication from the communication apparatus 101#0 via the communication apparatus 101#2 to the base station 102 as the specific communication channel in the past and that the transmission speed of the specific communication channel is 70 [Mbps].

In this case, if the transmission speed required for the application is 100 [Mbps], the specifying unit 314 specifies a communication channel other than the communication channel for communication from the communication apparatus 101#0 via the communication apparatus 101#2 to the base station 102 as a new specific communication channel. For example, the specifying unit 314 specifies the communication channel for communication from the communication apparatus 101#0 via the communication apparatus 101#1 to the base station 102 as a new specific communication channel.

The calculating unit 318 subsequently calculates an evaluation value for each apparatus included in the new specific communication channel and the setting unit 319 sets a new execution object apparatus executing the communication process out of the apparatuses included in the new specific communication channel based on the calculated evaluation value group. After the setting, the determining unit 316 determines whether the newly set execution object apparatus is its own apparatus and, if the new execution object apparatus is not its own apparatus, the transferring unit 320 transfers the communication process to the new execution object apparatus.

Figure 27:
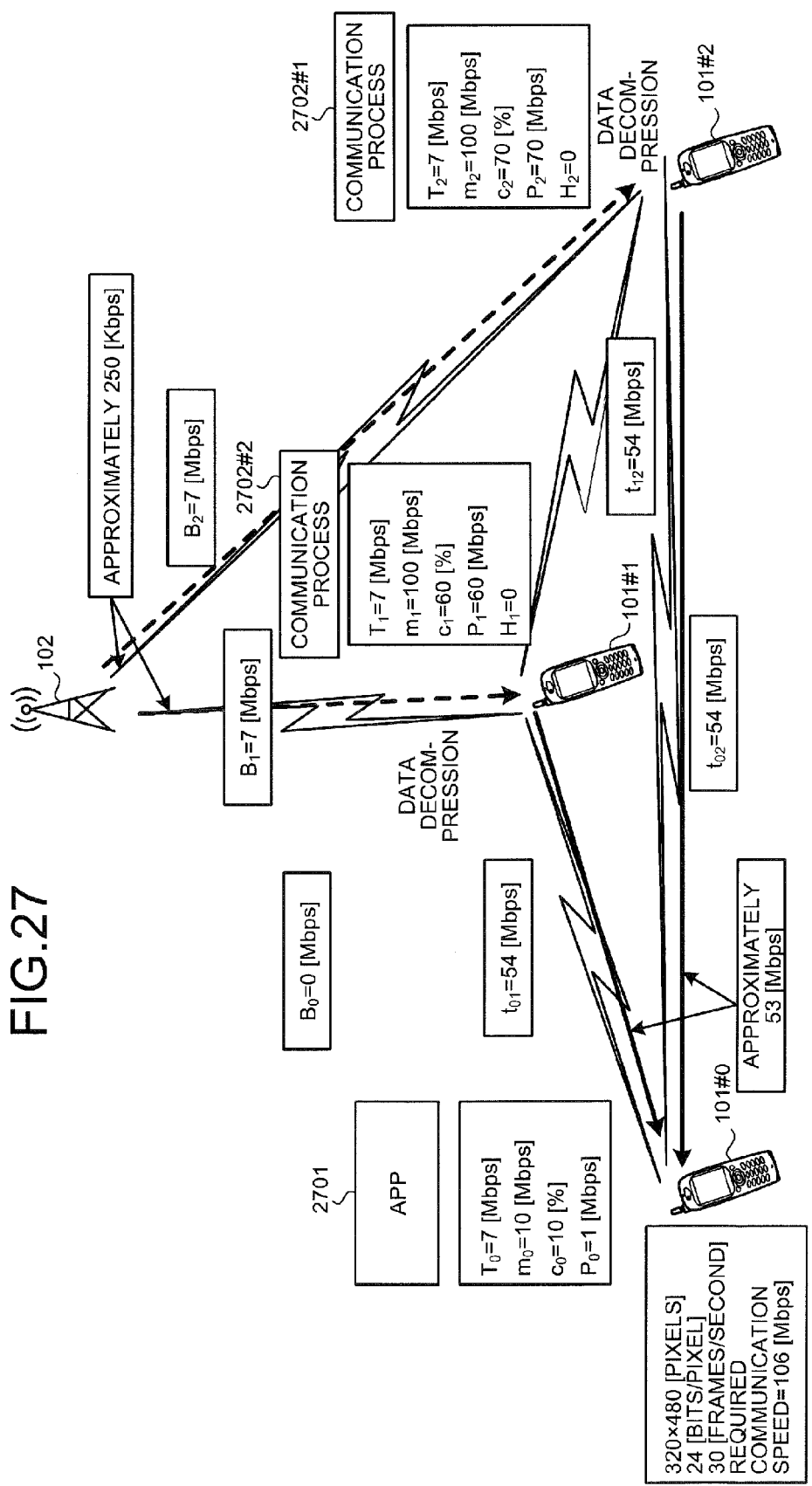
FIG. 27 is an explanatory view of operation of dividing and executing a communication process in multiple communication apparatuses 101.

FIG. 27 is an explanatory view of operation of dividing and executing a communication process in the multiple communication apparatuses 101. In FIG. 27, it is assumed that an application 2701 executed by the communication apparatus 101#0 is a streaming video reproduction application.

Video for streaming reproduction by the application 2701 is video having a screen size of 320×480 [pixels] and 24-bit color information at 30 [frame/sec]. Therefore, the transmission speed required for the application 2701 is 480*320*24*30106 [Mbps]. The streaming video reproduced by the application 2701 is assumed to be highly compressed and it is assumed that data for one second can be compressed to about 500 [Kbytes]. Since the application 2701 requires a higher value of the CPU processing speed while the transmission speed may be lower, the communication system 100 sets the processing speed P as an optimal-apparatus evaluation value.

In the state of FIG. 27, it is assumed that the direct communication channel between the communication apparatus 101#0 and the base station 102 is interrupted, resulting in $B_0$=0 [Mbps]. The other transmission speeds are assumed to be $B_1$=$B_2$=7 [Mbps]. The transmission speeds t between the communication apparatuses 101 are assumed to be $t_{01}$=$t_{02}$=$t_{12}$=54 [Mbps].

The parameter table 301#0 stores $m_0$=10 [Mbps] and $C_0$=10[%] as values related to the communication apparatuses 101#0. The communication apparatus 101#0 executes the parameter update process to accept $T_1$=$T_2$=7 [Mbps], $P_1$=60 [Mbps], $P_2$=70 [Mbps], and $H_1$=$H_2$=0 from the communication apparatus 101#1 and the communication apparatus 101#2. After the acceptance, the communication apparatus 101#0 uses Equation (1) and Equation (2) to calculate and register $T_0$=7 [Mbps] and $P_0$=1 [Mbps] into the parameter table 301#0.

The communication apparatus 101#0 specifies the communication apparatus 101#2 having the largest evaluation value from the relay-apparatus evaluation value group ($B_0$, Min($T_1, t_n$), Min($T_2, t_{o2}$))=(0, 7, 7) as a relay apparatus out of the communication apparatus 101#1 and the communication apparatus 101#2. The communication apparatus 101#0 sets the communication apparatus 101#2 as a best apparatus from an optimal-apparatus evaluation value group ($P_0, P_2$)=(1, 70). After the setting, the communication apparatus 101#0 dispatches a communication process 2702#1 to the communication apparatus 101#2.

However, the communication apparatus 101#2 has an optimal-apparatus evaluation value $P_2$=70 [Mbps] and therefore cannot satisfy the transmission speed 106 [Mbps] required for the application 2701. In the case of FIG. 27, because of $t_o2$=54 [Mbps], the communication apparatus 101#2 can transfer decompressed video data only up to 54 [Mbps]. Therefore, the communication apparatus 101#0 may set another best apparatus other than the already set best apparatus and may dispatch the communication process to the other best apparatus.

For example, the communication apparatus 101#0 specifies as a second relay apparatus the communication apparatus 101#1 having the largest evaluation value of the relay-apparatus evaluation value group (0, 7, 7) except the communication apparatus 101#2 defined as an optimal apparatus. In this case, the communication apparatus 101#0 may set "2" indicative of the second relay apparatus in the V field of the communication apparatus 101#1 in the parameter table 301#0. The communication apparatus 101#0 sets the communication apparatus 101#1 as a second best apparatus from an optimal-apparatus evaluation value group ($P_0, P_1$)=(1, 60) of the communication apparatus 101#0 and the second relay apparatus. After the setting, the communication apparatus 101#0 dispatches a communication process 2702#2 to the communication apparatus 101#1.

As described above, if one communication apparatus 101 cannot satisfy a requirement of an application, the communication system 100 depicted in FIG. 27 can distribute a communication process to the multiple communication apparatuses 101 for execution, thereby satisfying the requirement of the application. For specific communication volume, the communication apparatus 101#1 and the communication apparatus 101#2 receive compressed data at about 250 [Kbps] and decompress the compressed data. After the decompression, the communication apparatus 101#1 and the communication apparatus 101#2 transmit the decompressed data at about 53 [Mbps] to the communication apparatus 101#0.

FIG. 28 is an explanatory view of an example of storage contents of the application attribute table 2801 according to the third embodiment. The application attribute table 2801 includes an application requirement transmission speed field in addition to the fields include in the application attribute table 2401. The application name field, the CPU processing speed requirement field, and the transmission speed requirement field are equivalent to the application attribute table 2401 and therefore will not be described.

An application requirement transmission speed is a transmission speed required for an object application. For example, the mailer application has a lower application requirement transmission speed because both the CPU processing speed requirement and the transmission speed requirement are lower, and the application requirement transmission speed field stores 1 [Mbps]. Similarly, the downloader application has a higher application requirement transmission speed because of the higher transmission speed requirement, and the application requirement transmission speed field stores 100 [Mbps].

The network game application has a higher CPU processing speed requirement and the application requirement transmission speed field stores 50 [Mbps]. The streaming video reproduction application has a higher application requirement transmission speed because both the CPU processing speed requirement and the transmission speed requirement are higher, and the application requirement transmission speed field stores 106 [Mbps].

The communication system 100 according to the third embodiment refers to the application attribute table 2801 to execute a communication process. The communication system 100 according to the third embodiment executes all the processes of the process group depicted in FIGS. 16 to 23 equivalent to the communication process 100 according to the first embodiment except the communication-process execution process. Therefore, the communication-process execution process according to the third embodiment will be described with reference to FIG. 29.

FIG. 29 is a flowchart of the communication-process execution process according to the third embodiment. The communication apparatus 101#0 receives a communication request from the application 2701 (step S2901). After the receipt, the communication apparatus 101#0 sets a variable i to one (step S2902). After the setting, the communication apparatus 101#0 executes an optimal-apparatus setting process to set an i-th best apparatus (step S2903). An optimal-apparatus setting process at step S2903 may be an optimal-apparatus setting process of the first embodiment or an optimal-apparatus setting process of the second embodiment.

After the setting, the communication apparatus 101#0 determines whether the communication apparatus 101#0 is set as the i-th best apparatus (step S2904). If the communication apparatus 101#0 is set as the i-th best apparatus (step S2904: YES), the communication apparatus 101#0 executes a communication process 2702#i by itself (step S2905). If the communication apparatus 101#0 is not set as the i-th best apparatus (step S2904: NO), the communication apparatus 101#0 supplies the communication process 2701#i and a dispatch response request for the communication process 2701#i to a communication apparatus 101#x set as an optimal apparatus (step S2906). The communication apparatus 101#x receiving the supply executes the communication-process dispatch response process (step S2907).

After the process of step S2905 or S2906 is completed, the communication apparatus 101#0 determines whether the application making the request has a lower CPU processing speed requirement and a lower transmission speed requirement (step S2908). If one or both of the CPU processing speed requirement and the transmission speed requirement are not low (step S2908: NO), the communication apparatus 101#0 determines whether the total of an optimal-apparatus evaluation values of the first to i-th best apparatuses is equal to or greater than the application requirement transmission speed of the application 2701 (step S2909).

If the total of an optimal-apparatus evaluation values is less than the application requirement transmission speed (step S2909: NO), the communication apparatus 101#0 determines whether a communication apparatus 101 available for dispatch is present (step S2910). If present (step S2910: YES), the communication apparatus 101#0 executes the relay-apparatus specifying process with the i-th best apparatus removed from the relay-apparatus evaluation value group (step S2911). For example, the communication apparatus 101#0 replaces and executes step S1701 with "selecting a record having a maximum value of the relay-apparatus evaluation values, i.e., B of the communication apparatus 101#0 and Min(T, t) of the other apparatuses except the i-th best apparatus". After the execution, the communication apparatus 101#0 increments the variable i (step S2912) and goes to the process of step S2903.

If the CPU processing speed requirement is low and the transmission speed requirement is low (step S2908: YES) or if the total of an optimal-apparatus evaluation values is equal to or greater than the application requirement transmission speed (step S2909: YES), the communication apparatus 101#0 terminates the communication-process execution process. If a communication apparatus 101 available for dispatch does not exist (step S2910: NO), the communication apparatus 101#0 terminates the communication-process execution process.

In the process of step S2909, even if the total of an optimal-apparatus evaluation values of the first to i-th best apparatuses is the application requirement transmission speed of the application 2701, for example, a transmission speed between the communication apparatuses 101 may act as a bottleneck and the requirement of the application may not be satisfied. In such a case, the communication apparatus 101#0 may execute the process of step S2909: NO if a reception speed of an actually received data volume is equal to or less than the application requirement transmission speed of the application 2701.

As described above, according to the communication apparatus and the communicating method, if a transmission speed of the specific communication channel is lower than a transmission speed required for an application generating a communication process, a new specific communication channel other than the specific communication channel is specified and the communication process is transferred to an apparatus in the new specific communication channel. As a result, if one communication apparatus cannot satisfy the requirement of the application, the communication apparatus can allow multiple apparatuses to execute the communication process to satisfy the requirement of the application.

The communication method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication apparatus that includes a first CPU that is configured to execute, at a first processing speed and among processes of applications executed by the communication apparatus, a partial process using data transmitted through a communication channel, the communication apparatus comprising:
 a control unit configured to:
  measure a transmission speed of a first transmission channel when direct communication is executed between the communication apparatus and a base station;
  collect from at least one other apparatus, and based on the transmission speed of the first transmission channel, (1) a second processing speed at which a second CPU included in the other apparatus is capable of executing the partial process, and (2) a transmission speed of the second transmission channel when communication is executed between the communication apparatus and the base station via the other apparatus, wherein the transmission speed of the second transmission channel is based on a transmission speed between the communication apparatus and the other apparatus and a transmission speed between the other apparatus and the base station;
  specify one of the first communication channel and the second communication channel as a specified communication channel, based on the transmission speed of the first transmission channel and the transmission speed of the second transmission channel;
  determine, when the specified communication channel is the second transmission channel and based on the first processing speed, the transmission speed of the first transmission channel, the second processing speed, and the transmission speed of the second transmission channel, whether the partial process is to be transferred to the other apparatus; and
  transfer, based on a determination result, the partial process to the other apparatus by transmitting an execution code of the partial process to the other apparatus.

2. The communication apparatus according to claim 1, wherein
 control unit, when a plurality of the other apparatuses is present, determines whether the partial process is to be transferred to an apparatus whose smallest value among the transmission speed of the second transmission channel and the second processing speed, is largest.

3. The communication apparatus according to claim 1, wherein
 the control unit recovers an execution result of the partial process transferred to the other apparatus.

4. The communication apparatus according to claim 1, wherein
 the control unit determines whether the partial process is to be transferred to the other apparatus, based on an attribute of an application that is a generation source of the partial process.

5. The communication apparatus according to claim 1, wherein
 the communication apparatus has memory for registering the transmission speed of the second transmission channel and the second processing speed.

6. The communication apparatus according to claim 1, wherein
 the control unit controls the other apparatus such that communication occurring consequent to the partial process is performed via the other apparatus, when the specified communication channel is the second transmission channel.

7. The communication apparatus according to claim 6, wherein
 the control unit further specifies the specified communication channel from among the first communication channel and the second communication channel, based on the number of the other apparatuses present in the communication channels.

8. The communication apparatus according to claim 6, wherein the control unit, when the specified communication channel is the second transmission channel, determines whether the partial process is to be transferred to the other apparatus, based on a transmission speed of the specified communication channel and the first processing speed as well as a transmission speed between the other apparatus and the base station and the second processing speed.

9. The communication apparatus according to claim 8, wherein the control unit calculates, when the control unit specifies the specified communication channel, calculates an evaluation value for each apparatus included in the specified communication channel, based on a transmission speed from the apparatus to the base station and a processing speed at which the apparatus can execute the communication process sets, based on an evaluation value group calculated by the control unit, an execution object apparatus executing the partial process, out of an apparatus group included in the specified communication channel, determines whether the execution object apparatus set by the control unit is the communication apparatus, and transfers the partial process to the execution object apparatus, if the determining unit determines that the execution object apparatus is not the communication apparatus.

10. The communication apparatus according to claim 9, wherein the communication apparatus has memory for registering for each application, a transmission speed required for the application, the control unit specifies, when a transmission speed of the specified communication channel is lower than a transmission speed required for an application causing the communication process that referenced the memory, a new communication channel other than the specified communication channel, from among the first communication channel and the second communication channel, calculates, when the control unit specifies the new communication channel, an evaluation value for each apparatus included in the new communication channel, based on a transmission speed from the apparatus to the base station and a processing speed at which the apparatus can execute the communication process, sets, based on an evaluation value group calculated by the control unit, a new execution object apparatus executing the partial process, from among an apparatus group included in the new communication channel, determines whether the new execution object apparatus set by the control unit is the communication apparatus, and transfers, when the control unit determines that the new execution object apparatus is not the communication apparatus, the partial process to the new execution object apparatus.

11. A communication apparatus that includes a second CPU that is configured to execute, at a second processing speed and among processes of applications executed by another apparatus, a partial process using data transmitted through a communication channel, the communication apparatus comprising:

a control unit configured to:

communicate to the other apparatus, based on a request from the other apparatus that includes a first CPU capable of executing the partial process at a first processing speed, and directly communicates with a base station at a first communication speed, a transmission speed between the communication apparatus and the base station and the second processing speed; and execute the partial process with an execution code of the partial process and the data transmitted through the communication channel that are transmitted from the other apparatus, when a communication channel that includes the communication apparatus is specified by the other apparatus.

12. The communication apparatus according to claim 11, wherein in response to a request from the other apparatus, the control unit transmits an execution result of the partial process to the other apparatus.

13. The communication apparatus according to claim 11, wherein the control unit:

makes inquiries to at least one object apparatus for a third transmission speed between the base station and the object apparatus, and a third processing speed of a third CPU included in the object apparatus, and determines whether the partial process is to be transferred to the object apparatus, based on the third transmission speed between the base station and the object apparatus and the third processing speed.

14. The communication apparatus according to claim 11, comprising memory for registering the third transmission speed between the base station and the object apparatus and the third processing speed.

15. A communication method for a computer that includes a first CPU that is configured to execute, at a first processing speed and among processes of applications executed by the computer, a partial process using data transmitted through a communication channel, the communication method causes the computer to execute:

measuring a first transmission speed of a first communication channel when a direct communication is executed between the computer and a base station;

requesting, from a first apparatus, (1) a second processing speed at which a second CPU included in the first apparatus is capable of executing the partial process, and (2) a transmission speed of the second transmission channel when communication is executed between the computer and the base station via the first apparatus, wherein the transmission speed of the second transmission channel is based on a transmission speed between the computer and the first apparatus and a transmission speed between the first apparatus and the base station;

specifying one of the first communication channel and the second communication channel as a specified communication channel, based on the transmission speed of the first transmission channel and the transmission speed of the second transmission channel;

determining, when the specified communication channel is the second transmission channel and based on the first processing speed, the transmission speed of the first transmission channel, the second processing speed, and the transmission speed of the second transmission channel, whether the partial process is to be transferred to the first apparatus; and transferring, based on a determination result, the partial process to the first apparatus by transmitting an execution code of the partial process to the first apparatus.

16. The communicating method according to claim 15, wherein the first apparatus transmits to the computer the second transmission speed and the processing speed in response to a request from the computer.

17. The communicating method according to claim 15, wherein the first apparatus executes the partial process transferred from the computer.

\* \* \* \* \*